US012120151B2

(12) United States Patent
Coleman et al.

(10) Patent No.: US 12,120,151 B2
(45) Date of Patent: *Oct. 15, 2024

(54) LOW-LATENCY, OUTBOUND MESSAGE MONITORING, CONTROL, AND AUTHENTICATION

(71) Applicant: Fraudmarc Inc., Atlanta, GA (US)

(72) Inventors: Keith Wayne Coleman, Atlanta, GA (US); Richard Duncan, Atlanta, GA (US)

(73) Assignee: Fraudmarc Inc., Atlanta, GA (US)

(*) Notice: Subject to any disclaimer, the term of this patent is extended or adjusted under 35 U.S.C. 154(b) by 100 days.

This patent is subject to a terminal disclaimer.

(21) Appl. No.: 17/373,693

(22) Filed: Jul. 12, 2021

(65) Prior Publication Data
US 2021/0344721 A1 Nov. 4, 2021

Related U.S. Application Data

(63) Continuation of application No. 17/006,739, filed on Aug. 28, 2020, now Pat. No. 11,063,986.
(Continued)

(51) Int. Cl.
H04L 29/06 (2006.01)
G06F 16/245 (2019.01)
(Continued)

(52) U.S. Cl.
CPC .......... H04L 63/20 (2013.01); G06F 16/245 (2019.01); G06F 16/254 (2019.01); H04L 9/30 (2013.01);
(Continued)

(58) Field of Classification Search
CPC ... H04L 63/126; H04L 51/48; H04L 63/1483; H04L 63/20; H04L 61/1511; G06F 16/245; G06F 16/254
See application file for complete search history.

(56) References Cited

U.S. PATENT DOCUMENTS 11,063,986 B2 7/2021 Coleman et al.
11,805,151 B2 10/2023 Coleman et al.
(Continued)

FOREIGN PATENT DOCUMENTS

WO 2004075466 A2 9/2004
WO 2021041998 A3 3/2021

OTHER PUBLICATIONS

NPL Detecting Phishing with SPF Macros (Year: 2019).*
(Continued)

Primary Examiner — Tri M Tran
(74) Attorney, Agent, or Firm — BEKIARES ELIEZER LLP

(57) ABSTRACT

Embodiments of the present disclosure provide a first set of methods, computer-readable media, and system configured for: receiving a configuration for a domain name system (DNS) to log all queries; publishing a customized sender policy framework (SPF) policy to the DNS, the customized SPF policy comprising a macro-endowed mechanism; logging a plurality of received SPF customized queries; accessing a log comprising the plurality of received SPF customized queries; extracting data from each of the received SPF customized queries, the data being populated by the macro mechanism associated with the SPF customized query; populating a datastore with extracted data comprising at least one of the following: a username, a IP address, and a domain, as extracted from each received SPF customized query; and providing, based on the extracted data, an indication of outbound emails sent from the domain. In various embodiments, email authorizations and restrictions may be based thereon.

20 Claims, 13 Drawing Sheets

Related U.S. Application Data

(60) Provisional application No. 62/895,638, filed on Sep. 4, 2019, provisional application No. 62/893,526, filed on Aug. 29, 2019.

(51) Int. Cl.
  *G06F 16/25* (2019.01)
  *H04L 9/30* (2006.01)
  *H04L 9/40* (2022.01)
  *H04L 61/4511* (2022.01)

(52) U.S. Cl.
  CPC .......... *H04L 61/4511* (2022.05); *H04L 63/08* (2013.01); *H04L 63/102* (2013.01)

(56) References Cited

U.S. PATENT DOCUMENTS

| | | |
|---|---|---|
| 2006/0004896 A1 | 1/2006 | Nelson et al. |
| 2014/0082726 A1 | 3/2014 | Dreller et al. |
| 2016/0014151 A1* | 1/2016 | Prakash ................. H04L 47/62 726/22 |
| 2016/0285847 A1 | 9/2016 | Oberheide et al. |
| 2016/0315969 A1* | 10/2016 | Goldstein ........... H04L 61/4511 |
| 2017/0078321 A1 | 3/2017 | Maylor et al. |
| 2017/0093772 A1 | 3/2017 | Gupta |
| 2018/0083999 A1 | 3/2018 | Cherian |
| 2021/0067517 A1 | 3/2021 | Coleman et al. |
| 2021/0067559 A1 | 3/2021 | Coleman et al. |
| 2021/0097491 A1* | 4/2021 | Minyard ................. G06N 20/00 |
| 2021/0152610 A1* | 5/2021 | Fryback ................. H04L 63/205 |
| 2024/0098117 A1 | 3/2024 | Coleman et al. |

OTHER PUBLICATIONS

U.S. Non-Final Office Action dated Nov. 25, 2022 cited in U.S. Appl. No. 17/006,784, 31 pgs.

Related PCT Application No. PCT/US20/48646 filed Aug. 28, 2020 entitled "Low-Latency, Outbound Message Monitoring, Control, and Authentication" Inventors: Keith Wayne Coleman et al.

Wright, "Detecting Phishing with SPF Macros", Obtained from: https://duo.com/labs/tech-notes/detecting-phishing-with-spf-macros; Jul. 10, 2019, 5 pgs.

International Search Report and Written Opinion dated Feb. 17, 2021 cited in Application No. PCT/US2020/048646, 14 pgs.

Chandramouli et al., "Trustworthy Email," Draft (2nd) NIST Special Publication 800-177 2 Revision 1; Retrieved from Internet: https://csrc.nist.gov/CSRC/media/Publications/sp/800-177/rev-1/draft/documents/sp800-177r1-draft2.pdf; 49 pgs.

* cited by examiner

| user | vendor | permission |
|---|---|---|
| shane.ireland@example.com | sendgrid | yes |
| shane.ireland@example.com | docusign | no |
| shane.ireland@example.com | mailchimp | no |
| shane.ireland@example.com | ccontact | no |
| rose.kim@example.com | sendgrid | no |
| rose.kim@example.com | docusign | yes |
| rose.kim@example.com | mailchimp | no |
| rose.kim@example.com | ccontact | no |
| dept.marketing | sendgrid | yes |
| dept.legal | docusign | yes |

1100 — 1102 (user) — 1104 (vendor) — 1106 (permission)

FIG. 11

LOW-LATENCY, OUTBOUND MESSAGE MONITORING, CONTROL, AND AUTHENTICATION

RELATED APPLICATIONS

This application is a continuation of U.S. application Ser. No. 17/006,739 filed on Aug. 28, 2020, which issues on Jul. 13, 2021 as U.S. Pat. No. 11,063,986, which claims priority to U.S. Provisional Application No. 62/895,638 filed on Sep. 4, 2019 and U.S. Provisional Application No. 62/893,526 filed on Aug. 29, 2019. The disclosures of each of the aforementioned applications are hereby incorporated by reference.

FIELD OF DISCLOSURE

It is intended that each of the referenced applications may be applicable to the concepts and embodiments disclosed herein, even if such concepts and embodiments are disclosed in the referenced applications with different limitations and configurations and described using different examples and terminology. The present disclosure relates to system security and data transfers, and more specifically, to providing communication data, third-party email service provider authorization, and user-level outbound message control to administrators.

BACKGROUND

There are a number of different entities that may send email on behalf of a particular domain. For example, a company employee, an independent marketing representative, and a third-party marketing agency may all send email using the domain of the company. It is desirable for administrators to gather more data and have more control regarding the emails sent from a domain.

Electronic mail or email is a ubiquitous tool used by organizations for internal and external messaging. Legitimate users of an organization's email identity can include employees, contractors, and vendors. Also, third-party agencies can be configured to send email on behalf of the organization in order to fulfill service roles such as marketing and online document signature management.

Domain-based Message Authentication, Reporting, and Conformance (DMARC) and Sender Policy Framework (SPF), the validation process performed by the message receiver's email service provider can, through the use of these authentication protocols, forward information about the nominal sender to the domain of the sender immediately. Through regular channels, DMARC reports can take 24 hours or more to become available to a domain manager.

There has been no generally-available way for administrators to have immediate visibility into the volume of messages sent by specific users of a domain's email identity. The ability to determine message sending volume broken-down by individuals and third-party services would provide resource and security managers with the intelligence to better allocate assets and establish sending patterns that would be useful for detecting fraud and abuse.

SUMMARY

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure provide a first set of methods, computer-readable media, and system configured to perform the following stages:
receiving a configuration for a domain name system (DNS) to log all queries;
publishing a customized sender policy framework (SPF) policy to the DNS, the customized SPF policy comprising a macro-endowed mechanism for obtaining at least one of the following:
  a username,
  an IP address, and
  a domain;
logging a plurality of received SPF customized queries;
accessing a log comprising the plurality of received SPF customized queries; extracting data from each of the received SPF customized queries, the data being populated by the macro mechanism associated with the SPF customized query;
populating a datastore with extracted data comprising at least one of the following: the username, the IP address, and the domain, as extracted from each received SPF customized query; and
providing, based on the extracted data, an indication of outbound emails sent from the domain.

Embodiments of the present disclosure provide a second set of methods, computer-readable media, and system configured to perform the following stages:
publish a customized sender policy framework (SPF) policy to the DNS, the customized SPF policy comprising a macro-endowed mechanism for obtaining at least one of the following:
  a username,
  an IP address, and
  a domain;
log a plurality of received SPF customized queries;
access a log comprising the plurality of received SPF customized queries;
extract data from each of the received SPF customized queries, the data being populated by the macro mechanism associated with the SPF customized query;
populate the memory with extracted data comprising at least one of the following: the username, the IP address, and the domain, as extracted from each received SPF customized query; and
organize a display of the extracted data, the display being configured to provide an indication of outbound emails sent from the domain.

Embodiments of the present disclosure provide a third set of methods, computer-readable media, and system configured to perform the following stages:
enable a configuration of individual user authorizations to allow outbound messaging through a specification of one or more authorized vendors;
withhold from publication to the DNS at least one DKIM public key associated with the one or more authorized vendors;
publish a customized sender policy framework (SPF) policy to the DNS, the customized SPF policy comprising a macro-endowed mechanism for obtaining at least one of the following:
  a username,
  an IP address, and
  a domain;
logging a received SPF customized queries;

accessing a log comprising the received SPF customized queries;

extract data from the received SPF customized queries, the extracted data having been populated by the macro mechanism associated with the SPF customized query;

analyze the extracted data comprising at least one of the following: the username, the IP address, and the domain, as extracted from each received SPF customized query;

determine whether an individual associated with the username is authorized to utilize a vendor associated with the domain;

publish, upon a determination that the individual is authorized to utilize the vendor, a DKIM public key associated with the vendor.

Embodiments of the present disclosure provide a fourth set of methods, computer-readable media, and system configured to perform the following stages: receiving a configuration individual user authorizations for allowing outbound messaging through a specification of one or more authorized vendors;

publishing a customized sender policy framework (SPF) policy to the DNS, the customized SPF policy comprising a macro-endowed mechanism for obtaining at least one of the following:

a username,
an IP address, and
a domain;

logging a received SPF customized queries;

accessing a log comprising the received SPF customized queries;

extracting data from the received SPF customized queries, the extracted data having been populated by the macro mechanism associated with the SPF customized query;

analyzing the extracted data comprising at least one of the following: the username, the IP address, and the domain, as extracted from each received SPF customized query; and determining whether an individual associated with the username is authorized to utilize a vendor associated with the domain;

performing, upon a determination that the individual is authorized to utilize the vendor, a function to authorize the outbound messaging, wherein performing the function to authorize the outbound messaging comprises informing at least one function running a domain name system (DNS) so that an appropriate qualifier can be returned to for SPF verification.

Embodiments of the present disclosure provide a fifth set of methods, computer-readable media, and system configured to perform the following stages: receiving a configuration of individual user authorizations for allowing outbound messaging through a specification of one or more authorized vendors;

publishing a customized sender policy framework (SPF) policy to the DNS, the customized SPF policy comprising a macro-endowed mechanism for obtaining at least one of the following:

a username,
an IP address, and
a domain;

logging a received SPF customized queries;

accessing a log comprising the received SPF customized queries;

extracting data from the received SPF customized queries, the extracted data having been populated by the macro mechanism associated with the SPF customized query;

analyzing the extracted data comprising at least one of the following: the username, the IP address, and the domain, as extracted from each received SPF customized query;

determining whether an individual associated with the username is authorized to utilize a vendor associated with the domain;

performing, upon a determination that the individual is authorized to utilize the vendor, a function to authorize the outbound messaging. wherein performing the function to authorize the outbound messaging comprises providing an affirmative response to an authentication request in accordance with a corresponding messaging protocol utilized, at least in part, to perform a message request.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 11 illustrates an example of a configuration file.

DETAILED DESCRIPTION

Figure 1:
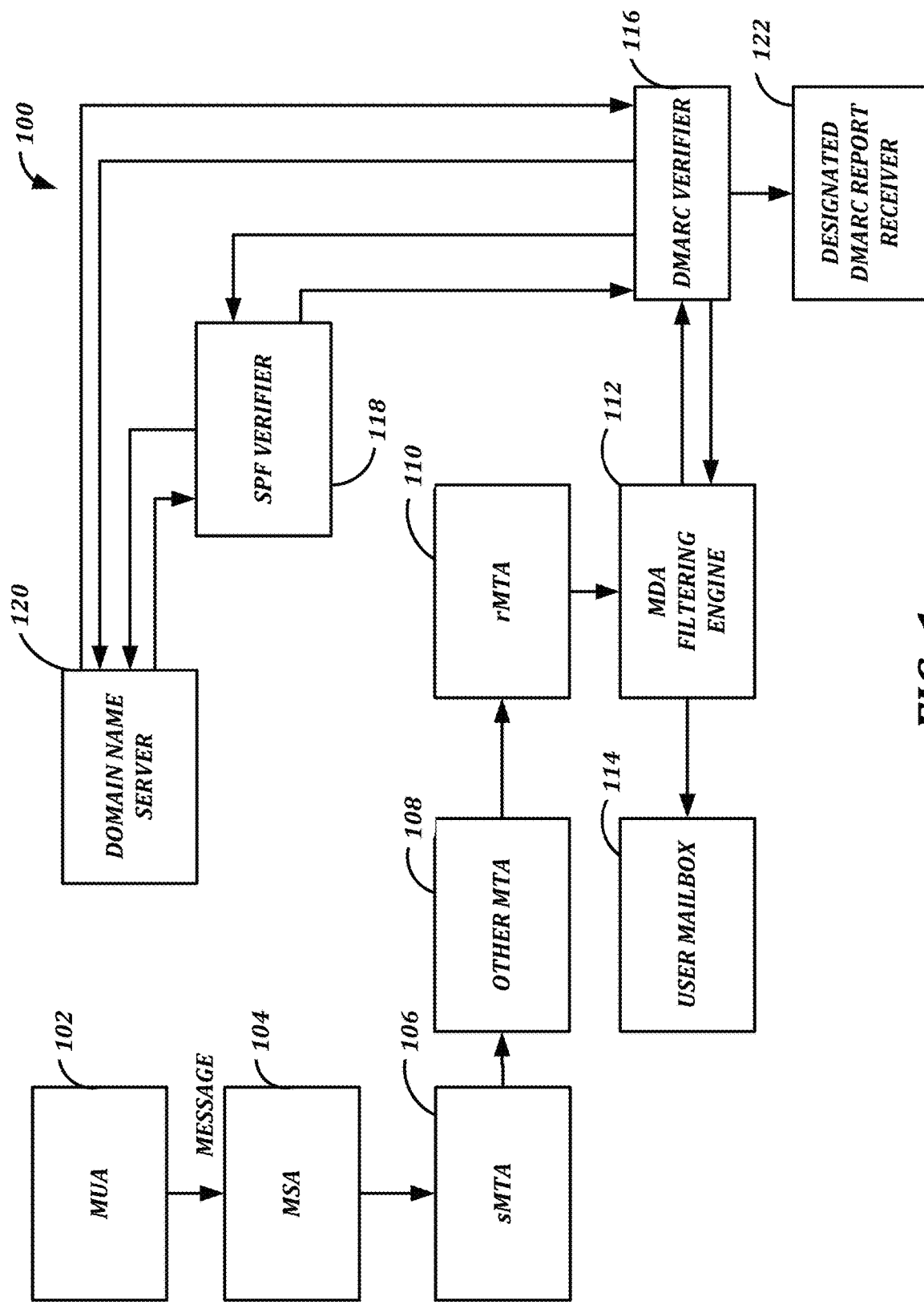
FIG. 1 illustrates an example of a block diagram of a message authorization flow.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Many electronic messaging technologies do not provide administrators information about outbound messages from a domain or multiple domains. A domain administrator may not be aware of outbound message sending volumes or patterns. Such electronic messaging technologies also fail to provide administrators with an ability to, for example, authorize messaging account holders to use external messaging service providers.

Gaining real-time intelligence about the sending behavior of individual accounts would provide more-immediate insights into security compromises and how to better allocate and secure sending resources. For example, some authorized users may typically send relatively few emails in the course of a day, while others may legitimately be associated with high volume sending bursts, e.g., marketing service agents. An unusual spike in the message volume sent from a low-usage account could be an indicator of a security breach or a mere change of user role within the organization. In the event of unauthorized usage, having immediate knowledge of such events allows a security manager to quickly intervene and take appropriate actions earlier in the process than would be possible with conventional means which could be days or weeks after the damage has been done.

Accordingly, the information about the nature and volume of sent messages provides a system administrator (e.g., a user of the methods and systems disclosed herein) with data associated with, for example, the sending of messages from an individual account. Embodiments of the present disclosure may provide such information without delay upon message receipt and authentication through methods and systems that can be utilized by the system administrator to gain, by way of non-limiting example, intelligence about sending patterns of those who send messages on behalf of the domain.

Such information may be valuable to identify, for example, how to improve the performance of the system. This may, in turn, enable the user to, for example, allocate resources according to the demands of the user. Further still, this information may also be used to identify a rise in sent messages from a particular account and investigate the account to identify, for example, a potential security failure.

The embodiments described herein may provide a user such as, for example, an administrator to collect data about email sent by domain users on behalf of the domain, such as, but not limited to, sending volume for individual users. As will be disclosed herein, this capability may be provided by, at least in part, using message authentication domain name system (DNS) queries.

Further still, embodiments described herein may provide methods and systems to enable an administrator to control, such as, but not limited to, perform restriction and authorization functionality. Said functionality may be used in, for example, but not limited to, permitting certain email account holders to use external mail service providers while restricting others. As will be disclosed herein, this capability may be performed in the various embodiments described herein using, at least in part, message authentication DNS queries. In these ways, embodiments of the present disclosure may provide a system administrator with faster insight and increased control of its users' out-bound email actions, thereby leading to a more regulated, secure and better performing system.

Still consistent with embodiments of the present disclosure, employing the methods and systems described herein, a system administrator may be enabled to view outgoing message data, such as, but not limited to, the volume of email sent by individual users on-demand. This may, in turn enable the administrator to more quickly identify potentially malicious activity in the system.

Further, various embodiments disclosed herein may allow the system administrator to take action based on a reading of the outgoing message data. For instance, in some embodiments, the system administrator may be enabled to tabulate email user accounts by sent message counts to better allocate messaging resources, which improves the operation of the system by improving the efficient use of resources. Such an efficient use of resources may reduce the message sending volume of the system thereby making the system run more cost effectively and, in some instances, faster for certain tasks. It should be understood that tabulation, for instance, is only one potential use case of the methods and systems disclosed herein.

In yet further embodiments, the system administrator may be enabled to control messaging permissions on a user level. For instance, the system administrator may be enabled to allow a first user to use an external messaging service provider while restricting a second user from using the same external messaging service provider. In accordance to the various embodiments disclosed herein, such functionality may be performed using, at least in part, DNS controls and/or, in some embodiments, the DMARC, SPF and DKIM protocol controls. By way of contrast, in conventional systems, such control may not be readily available to the system administrator through the domain controls on the sender-domain side alone, but rather take cooperation between the sender-domain and the external messaging server provider.

There are two important features of the SPF protocol that may be utilized for the various embodiments disclosed herein: i) a macro character sequences, and ii) an SPF mechanism, such as, but not limited to, the 'exists' term, a term is either a mechanism or a modifier, such as, but not limited to, 'redirect' modifier that accepts macros, many of the mechanisms that may accept macros ('a', 'include', 'exists', 'mx'), and others.

An SPF macro is a sequence of characters that, upon evaluation, are replaced with key message parameters. Examples of such message parameters include the source IP, the local-part of the sender, and the domain in the 'From' address. According to the SPF specification, one example term, such as the 'exists' term, is a sender mechanism for identifying IP addresses that either are permitted or are not permitted to use a domain's email identity. In accordance to various embodiments herein, combining the 'exists' mechanism with particular macro sequences will facilitate a method to account for an email being sent by a specific user in a nearly immediate way.

Consistent with the embodiments of the present disclosure, implementation may be achieved by, for example, the following stages: i) configuration of a DNS for authorizing domain to log all queries; ii) publication a specially-crafted SPF policy; and iii) extraction of information from the DNS query. The stages will be detailed throughout the present disclosure, in various embodiments.

Under the various schemes disclosed herein, the response of the query could be, by way of non-limiting example, 'NXDOMAIN' or 'Name error', meaning that the queried domain name does not exist in the DNS. Such a response may not be relevant or limit the functionality of the various embodiments herein. Rather, the intended functionality of such queries is to enable a subsequent extraction of data (e.g., the replacement of the macro terms contained within the actual query string). It should be understood that subsequent SPF policy and queries, that may return matching entries, can continue to function as intended and may not be impeded by the introduction of the SPF queries of the present disclosure.

Accordingly, in some embodiments, in order to best-ensure that a DNS query may be generated with appropriate sender information, an SPF policy may have the first term as a macro-endowed SPF term. By way of non-limiting example, an 'exists' mechanism may be employed. Alternative terms and mechanisms that may be used by a custom SPF policy are provided herein. With reference to the example "exists" mechanism, it may be configured to specify a domain name to use in a DNS A-record query during the SPF authentication process. When combined with the special SPF macro character sequences as described herein, the name of the domain to be queried can be constructed from a variety of message properties, including the sender's email address, IP, and the corresponding domain of the outbound server.

Still consistent with embodiments of the present disclosure, since a query resulting from such SPF policy may correspond to a non-existent domain, the result of this query could be 'NXDOMAIN' as described earlier. Furthermore, the desired information about the sent email is contained in the query string itself, and would be logged with the DNS. Thus, when this DNS query is made, the DNS logging system records the query into a log file. And, by virtue of, at least in part, the macro terms users, preceding each of the fields may be a unique string to demarcate each piece of information in the query. One of ordinary skill in the field of the present disclosure may employ various techniques and strategies for demarcating and/or extracting each information field.

Still consistent with embodiments of the present disclosure, the data that allows tracking of user-resolved email sending volume may be kept in a data store separate from the DNS query logs. Updates to this data may be pulled from the DNS query logs in an automated way, e.g., using timed scripts or triggered by some other means.

As an example, the data could be stored in a relational database with a table that contains fields corresponding captured by the macros along with a query timestamp, IP of the resolver used, or any other metadata that may be present in the query that is of interest.

In yet further embodiments, an Application Programming Interface (API) to this data store may be implemented. In this way, a user interface may be provided that is adapted to the system administrator's course of operations. The functions in the API perform the basic functions of querying the data store for specific contents. For example, to see all of the sending volume for a specific user, a query to filter results to include only results that label the user as the sender would be used. In turn, the results of this query could be ingested into an administrator interface that makes plain the amount of sent mail broken down by individual users, marketing accounts, etc.

Further still, in some embodiments, by using metadata from the DNS query data and other IP intelligence sources, information about a user's sent email can be supplemented with other valuable insights such as geographical location of the sending server and resolving IP.

Having access to such data may enable the system administrator to configure various control means. For instance, some embodiments of the present disclosure may enable the system administrator to construct logic that may selectively authorize specific users for permission to use specific vendors. The vendors may provide, for example, email forwarding services.

This may be achieved by enabling the administrator to set policies based on data extracted from the DNS query log. There may be a plurality of methods and systems the administors may impose such restrictions (e.g., it could be anticipated that protocols in current development or future development may rely on certain aspects of the present disclosure to achieve the desired results and, therefore, are contemplated with the scope of applicable methods and systems used in conjunction with the present disclosure). The present disclosure provides a few methods and systems for illustrative purposes.

In one aspect, a system may be configured to publish DKIM public keys upon a determination that both a user and an IP address, as extracted from the DNS query data, are approved for email communication. Accordingly, at the organizational level, the system administrator may configure individual user authorizations on a per-vendor basis. In some embodiments, the system administrator may further opt to hold but not to publish each vendor's DKIM public key to their DNS. In yet other embodiments, alternative means to publish DKIM public keys may be employed. In turn, when the extracted DKIM query data is processed, it may be determined that an authorized user using an IP associated with an authorized vendor may send an email message, the DNS may be configured to publish, with a short TTL, the DKIM public key associated with the corresponding vendor. That is, in various embodiments, the DKIM public key associated with the corresponding vendor may be temporarily published for enough duration to allow the message to undergo DKIM verification.

In another aspect, embodiments of the present disclosure may employ backend processing of authorization checks (e.g., vendor, user, IP—as one example referred to in FIG. 9.) can inform functions running on the DNS server so that an appropriate qualifier (e.g., pass, fail, soft-fail, neutral) can be returned to an external SPF verifier. In some embodiments, both aspects may be employed in whole or in part.

Still consistent with embodiments of the present disclosure, other logic may be constructed in order to allow the aforementioned user and vendor level control. For example, the construction of subsequent SPF queries of the SPF processing to trigger a match may be provided and enable such authentication on demand. Such process can be performed by, for example, the DNS server and/or various computing elements and software modules operating in conjunction therewith. This may be accomplished by, for example, returning a value of 'pass' or 'fail' to the SPF verifier according to the results of the desired set of permission checks (user, vendor, IP, etc.). It should be understood that the stages disclosed to be performed with reference to the DNS operations, even though they may be disclosed to be performed under various labels and computing elements, may be combined into a single stage, or dispersed further into yet additional stages, performed by the same or separate computing elements. It is, therefore, intended that the disclosed stages and computing elements are an abstraction that one of ordinary skill in the field of the present disclosure could use to enable various configurations contemplated to be within the spirit and scope of the present disclosure.

Throughout the various embodiments disclosed herein, security measures may be considered. In one instance, since SPF policies are published in public-viewable DNS records, it would be simple for an adversary to use the above-described 'exists' mechanism term against a domain by flooding their DNS log files with many queries that imitate legitimate SPF lookups. For example, one merely needs to automate many DNS A-record queries directly to the following name:

_i.209.XXXXX41._o.example.com._d.example.com._l.joe._h.google.com.example.c om

If such queries were directed at the domain, perhaps with varying fields with fake IPs and domains, then the data becomes corrupted and the sender statistics become unreliable.

One method to validate DNS log data is to ensure that an organizational domain associated with the IP address of the querying agent matches the organizational domain of the IP field in the query. For example, suppose that the query above is performed from the IP 2400:cb00:27:1024::ac45:ec23. This latter IP is associated with a Cloudflare DNS while the IP in the query name is 209.XX.XXX.41 which is associated with Google. Since these two organizations are not consistent one might reasonably conclude that this query should not be used in the sender intelligence scheme.

Another strategy for mitigating this risk is to weigh the validity of suspicious DNS queries against the IP reputations of the server that is performing the lookup. In particular, the DNS resolvers associated with well-known and reputable email inbox providers are less likely to be engaged in behaviors that obstruct legitimate operations or compromise security of the queried domain.

Referring now to the figures and their accompanying description. Although modules (e.g., the enumerated software and/or hardware elements illustrated in the figures, such as a DNS) are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specification. Each component disclosed for one module may be mixed with the functionality of another module. In the present disclosure, each component can be claimed on its own and/or interchangeably with other components of other modules.

Referring now to the various figures depicting methods, flow charts, and operational diagrams, along with their corresponding description (collectively referred to herein as "methods"). Such methods serve as examples of one or more methods that may be performed by at least one of the aforementioned modules, or components thereof. Various hardware components may be used at the various stages of operations disclosed with reference to each module. For example, although methods may be described to be performed by a single computing device (e.g., a DNS), it should be understood that, in some embodiments, different operations may be performed by different networked elements in operative communication with the computing device. For example, at least one computing device 1300 may be employed in the performance of some or all of the stages disclosed with regard to the methods. Similarly, an apparatus may be employed in the performance of some or all of the stages of the methods. As such, the apparatus may comprise at least those architectural components as found in computing device 1300.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

FIG. 1 illustrates an example of a block diagram of a message authorization data flow 100 in a SPF that includes DMARC. The message is generated by the mail user agent (MUA) 102 and sent to the mail submission agent (MSA) 104. The MSA 104 receives email messages from the MUA 102 and negotiates message delivery with a sending mail transfer agent (sMTA) 106. The message may be forwarded by other MTAs 108 until the message is received by the receiving MTA (rMTA) 110. The message is transferred to the mail delivery agent (MDA) of the domain of the addressee in the MDA filtering engine in block 112.

The message is sent to the DMARC verifier portion 116. An SPF verifier portion 118 has inputs extracted from the message headers. The SPF verifier portion 118 attempts to validate messages against the SPF policy published at the alleged sender's domain until, for example, a match or error is found. The results of message validation could be a match, non-match, or an exception.

Validation of the message is performed using the returned SPF policy and the message header data. The DNS query for the DMARC policy of the sending domain is performed in block 120.

The results of the DNS query for sending the DMARC policy of the domain are returned to block 116. The results of the DMARC verifier 116 are sent to the MDA 112.

In block 114, the message is delivered to the user mailbox of a receiver (a user) following authentication and assertion in the published policy. In block 116, a DMARC report is generated and sent to a designated DMARC report receiver in block 122, which may include, for example, a memory location or a terminal of a user.

Figure 2:
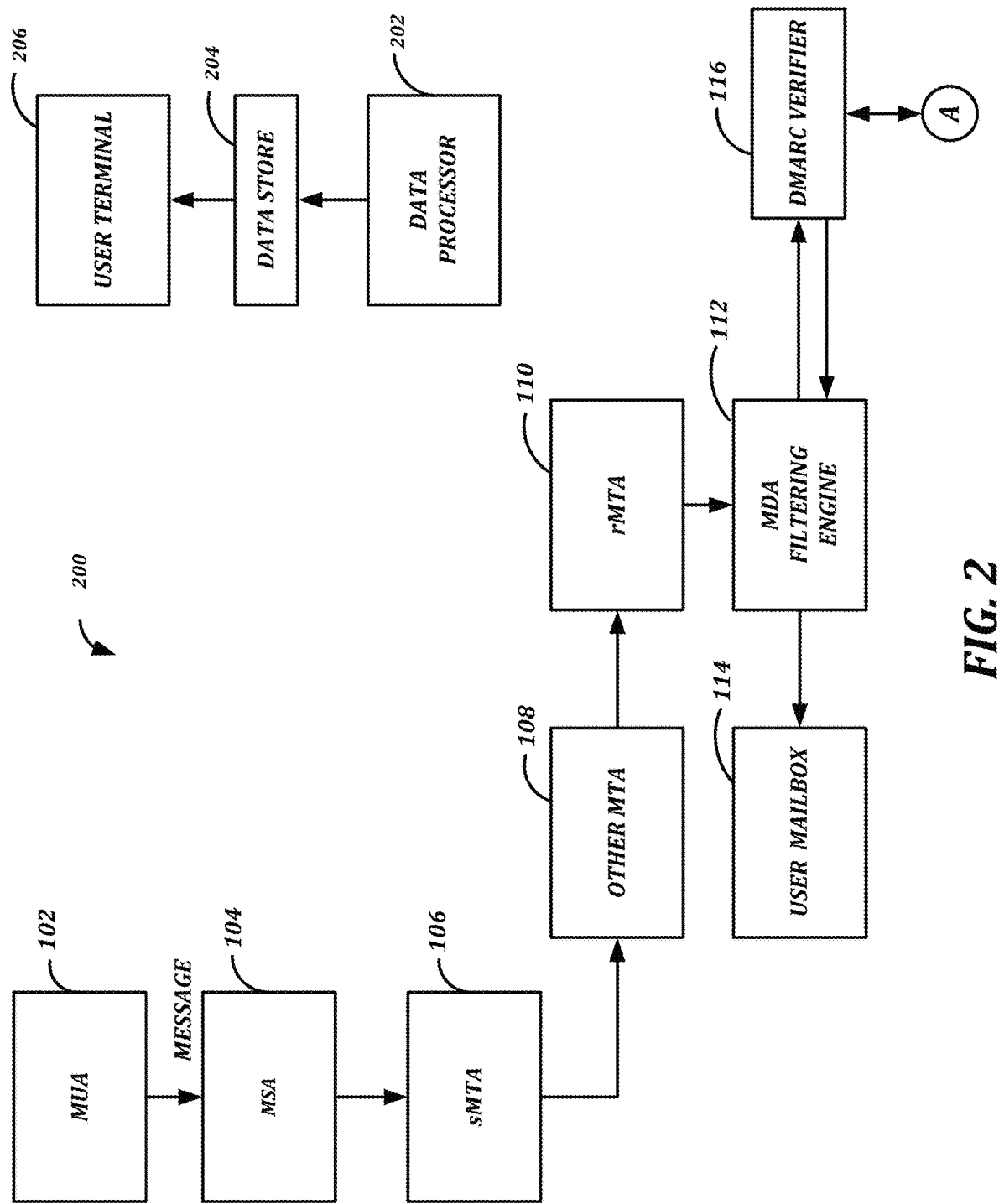
FIGS. 2 and 3 illustrate a block diagram of an example embodiment of a flow of data sent in a message volume monitoring system.
Figure 3:
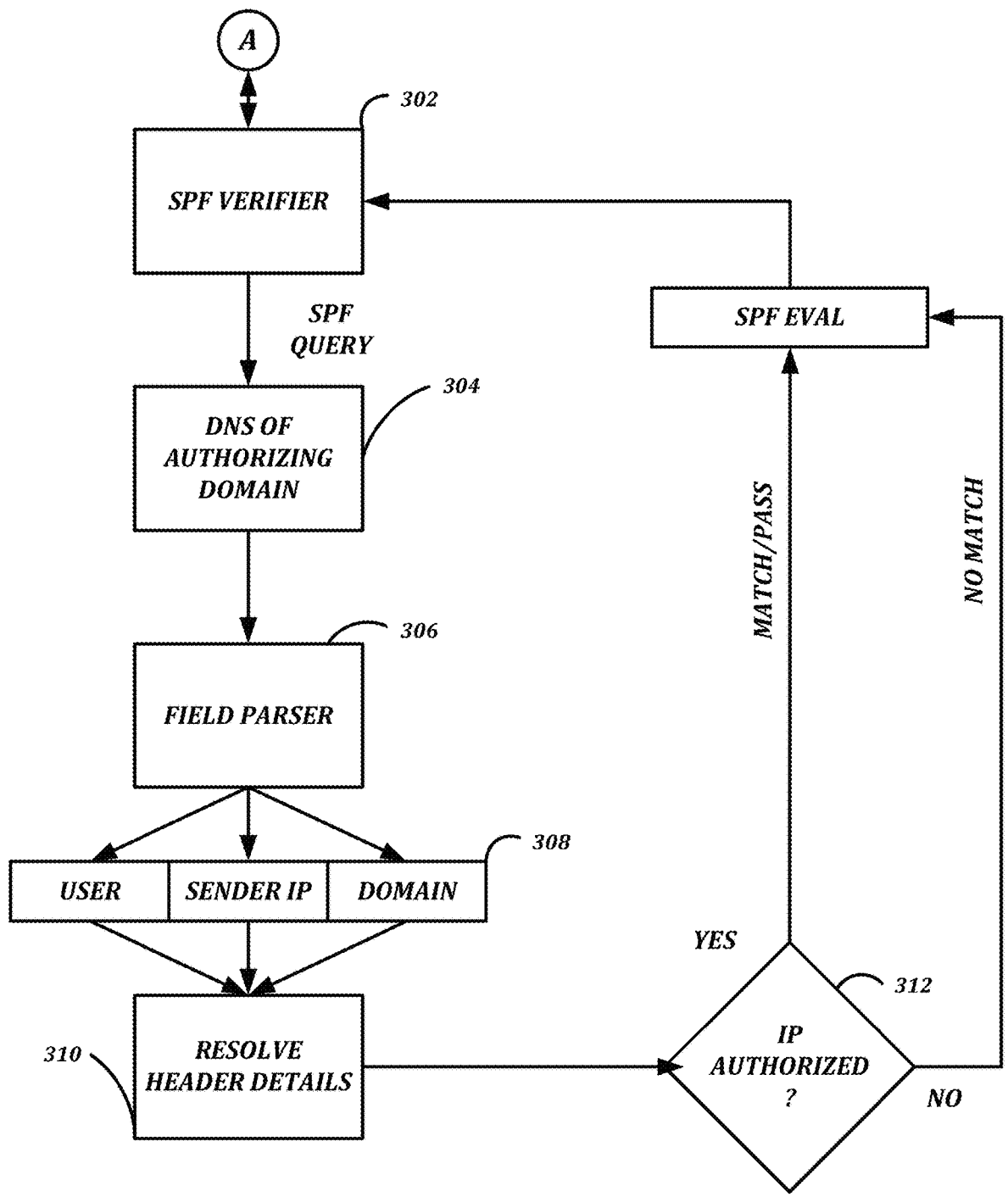

FIGS. 2 and 3 illustrate a block diagram of an example embodiment of a flow of data sent by message volume (number of messages over time) monitoring system 200 having low-latency.

Referring to FIG. 2, the message is generated by the MUA 102 (of FIG. 2) and sent to the mail submission agent (MSA) 104. The MSA 104 receives email messages from the MUA 102 and negotiates message delivery with a mail transfer agent (MTA) 106. The message may be forwarded by other MTAs 108 until the message is received by the receiving MTA (rMTA) 110. The message is transferred to the MDA of the domain of the addressee in block 112 and, subject to message verification checks, may be delivered to the User Mailbox 114.

The message may be sent to the DMARC verifier portion 116. The verifier retrieves inputs extracted from the message headers. Validation of the message is performed using the returned SPF policy and the message header data.

FIG. 3 illustrates a continuation of the diagram of FIG. 2. In this regard, the SPF verifier 302 is called with desired inputs extracted from the message headers during the SPF query in block 302. The SPF query may be any term or mechanism through which a macro may be used to capture data and transmit data. Accordingly, during the SPF evaluation process, the macro-endowed term affects a query of the domain's DNS.

For example, in one embodiment, the "exists" term may be used. The "exists" is parsed into fields corresponding to those found in Table 1 below by the field parser 306. In addition to the 'exists' mechanism, this could also be an 'a', 'include', etc. mechanism, or any SPF term that is subject to macro expansion, may have the same effect.

In various embodiments, the macro terms of the employed SPF term may obtain a username, an IP address, and other parameters of the message. Accordingly, the macro parameters, such as the username, the sending domain, and the sending internet protocol address (IP address) may be extracted in block 308. Header details are resolved in block 310. In block 312, the message source IP is compared to the list of IPs asserted in the SPF policy of the domain. If a match is found, the result of the SPF check is "pass", which is returned to the receiving domain. If no match is found, the result of the check may be NXDOMAIN or one of the SPF qualifiers 'fail', 'soft fail', or 'neutral'. In either case, i.e., a "pass" or NXDOMAIN result, the data and the result are assembled in preparation for writing into the data store.

Referring back to FIG. 2, data is written into the data store 204. The data store is accessible to the administrator application displayed to the user on the user terminal 206. This gives fast access to the sending volume of individual users that can be presented to users using multiple user interfaces.

Consistent with embodiment of the present disclosure, data processor 202 may be employed to, for example, populate the data store. This may be performed by, for example, the data processor accessing the DNS query log and processing the queries contained therein. In some embodiments, for instance, the processing would be based on anchor characters used to, for instance, identify the locations associated with data captured from the macro sequences associated with the SPF policies corresponding to the queries. Such extracted data may then be provided to data store 204, which may then be employed for displaying data or enabling actions based upon the data.

Figure 4:
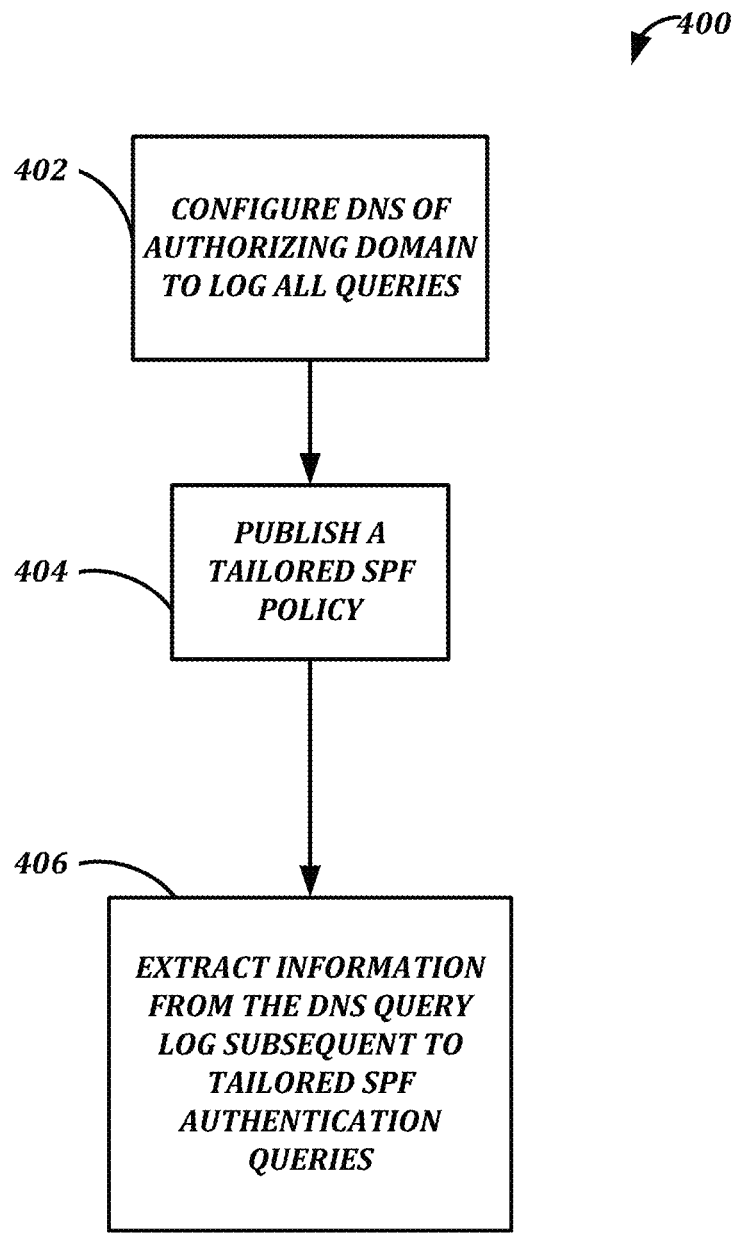
FIG. 4 illustrates a block diagram of an example method for performing the methods described.

FIG. 4 illustrates a block diagram of an example method 400 for performing the methods described above. In block 402, the DNS of the authorizing domain is configured to log queries. Under the scheme described below, which are disclosed as examples for illustrative purposes, the response of the query could be 'NXDOMAIN' or 'Name error' [3, 8], meaning that the queried domain name does not exist in the DNS. Such a response may not be relevant to the sender volume resolution described here as the information to be extracted will be contained in the actual query string.

In block 404, a tailored SPF policy is published. In order to best-ensure that the sender will be counted, an SPF policy should have as the first term an SPF mechanism or modifier with a macro character sequence. As one non-limiting example, the 'exists' mechanism specifies a domain name to use in a DNS A-record query during the SPF authentication process. When combined with the special SPF macro character sequences as described in RFC 7208, the name of the domain to be queried can be constructed from a variety of message properties, including the email address of the sender, IP, and the HELO/EHLO domain of the outbound server.

As one non-limiting example, an 'exists' term published as part of an SPF policy published in a domain's DNS is:
exists:_i. %{i}._o. %{o}._d. %{d}._l. %{l}._h.%{h}.example.com A summary of the terms constituent to the 'exists' mechanism, used herein as a non-limiting example, is provided in Table 1 with the macro term and description of its expansion described respectively in the first two columns. The third column contains the corresponding term expansions for the example where a user 'joe@example.com' sends an email using a google SMTP server with IP '209.XX.XXX.41". Table 1 illustrates examples of SPF macros used in the email sender intelligence.

TABLE 1

SPF macros used in an example email sender intelligence scheme.

| macro term | description | sample value |
| --- | --- | --- |
| %{i} | IP address of the SMTP client that is emitting the mail, either IPv4 or IPv6. | 209.XX.XXX.41 |
| %{o} | domain of the "MAIL FROM" or "HELO" identity | example.com |
| %{d} | domain that provides the sought-after authorization information; initially, the domain portion of the "MAIL FROM" or "HELO" identity. | example.com |
| %{l} | local-part of sender | joe |
| %{h} | HELO/EHLO domain | google.com |

The full macro-substituted DNS name to be queried using this example is shown here:
_i.209.XX.XXX.41._o.example.com_d.example.com.l.joe_h.google.com.exampl e.com The information contained in this DNS name string may be saved. It may be saved as, for example, the query field in the corresponding DNS query log file when the SPF mechanism (i.e., 'exists' term) lookup is performed during SPF authentication.

In block 406, information is extracted from DNS query logs. In this example, the corresponding DNS query has the form shown:
_i.209.XX.XXX.41._o.example.com_d.example.com.l.joe_h.google.com.exampl e.com Since the query may correspond to a non-existent domain, the result of this query could be, in such example, 'NXDOMAIN' as described earlier. The information about the sent email may be contained in the query string itself as illustrated in Table 1. When this DNS query is made, the DNS logging system may record the information from the query into a log file.

One possible method to facilitate processing query information is described, though other processing strategies are possible. It should be understood that the underscore-demarcation method described herein is only one possible implementation that may be used to enable the spirit and scope of the embodiments disclosed herein. One of ordinary skill in the field of the present disclosure may appreciate that it is not the only implementation that may achieve the objective of certain embodiments. Accordingly, in some embodiments, preceding each of the fields is a unique string to demarcate each piece of information in the query is one possible means for demarcating and/or extracting each information field. For example, in the previous example, '_i.' (underscore, small-case letter I, and a period) precedes the IP address field and '_o.' (underscore, small-case letter O, and a period) precedes the 'MAIL FROM' identity field, etc. Engineering the query string in this way facilitates reliable matching on the specially-chosen preceding character strings so that individual fields can be extracted using common string matching methodologies, e.g., regular expression matching.

As mentioned above, for each of the fields, the string matching logic may be constructed as follows: 1. find label substring, e.g., _i. 2. match succeeding field, e.g., "209.XX.XXX.41" 3. stop matching at trailing period. This process may be performed until all field values are obtained. A timestamp may be added to the data harvested from the query term to facilitate time-resolution of each received message. Data from the DNS query logs may be accessible by administrator software for displaying the latest user sending-volume information. Alternatively, in various embodiments, timed scripts, a.k.a., cron jobs, can be used to regularly pull this data from the logs into the data store; for example, a script to do this could be configured to run once per minute or once per hour, depending on the time-resolution that is desired.

The data that allows tracking of user-resolved email sending volume may also be kept in a data store (memory) that may be separate from the DNS query logs. In some embodiments, updates to this data should be pulled from the DNS query logs in an automated way, e.g., using timed scripts or triggered by some other means. As an example, the data could be stored in a relational database with a table that, for example, may contain fields such as those example fields illustrated in Table 1, and, in some embodiments, along with a query timestamp, IP of the resolver used, or any other metadata that may be present in the query that is of interest.

Figure 5:
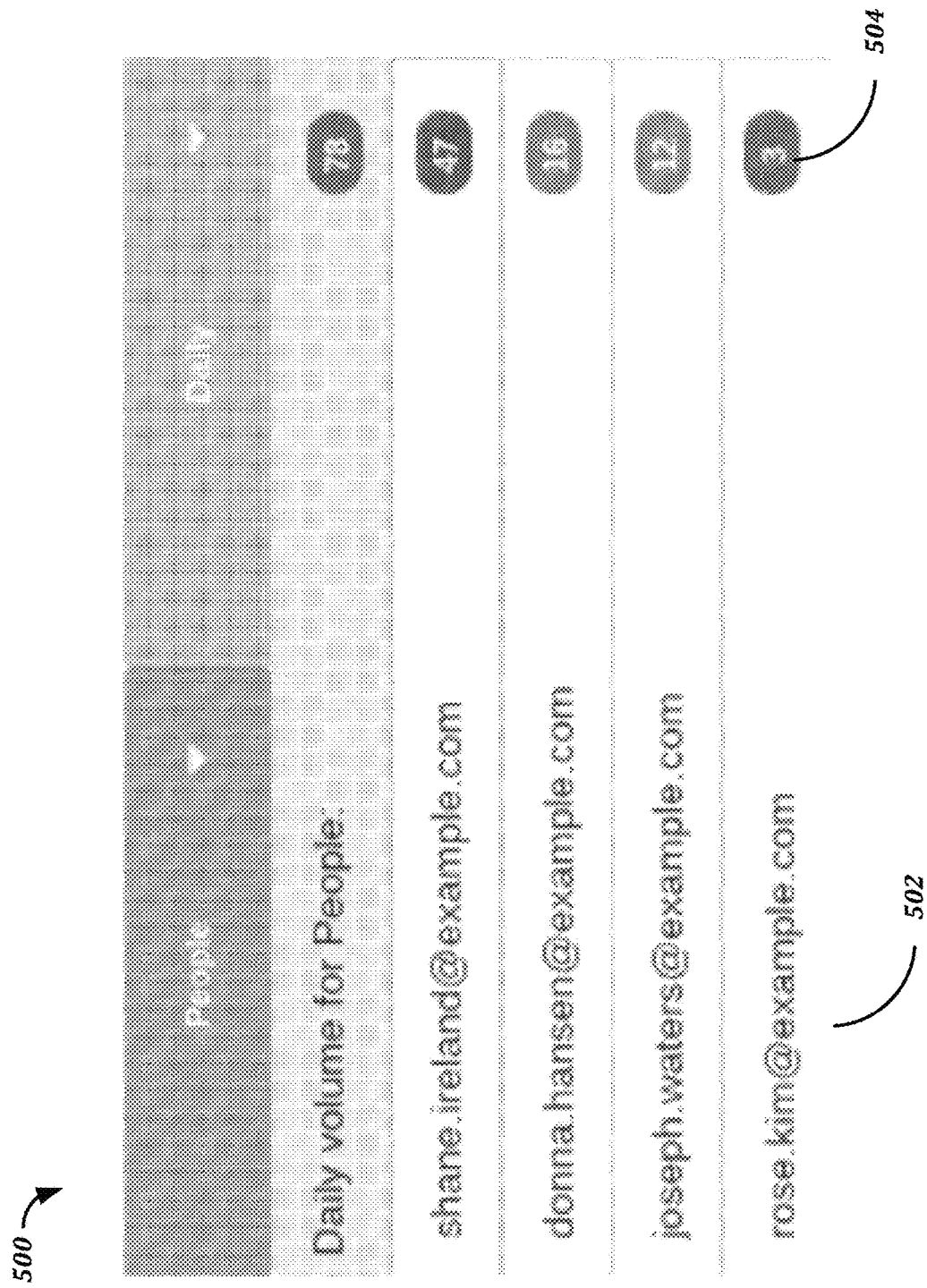
FIG. 5 illustrates a user interface.

A user interface provides access to the data store. The user may use filters or other means to access the desired data and desired metadata. FIG. 5 illustrates an example user interface 500 that has a first column 502 that includes identifiers of a user or user account. The second column 504 illustrates a number of emails sent daily (i.e., over a given time period) by each user.

Figure 6:
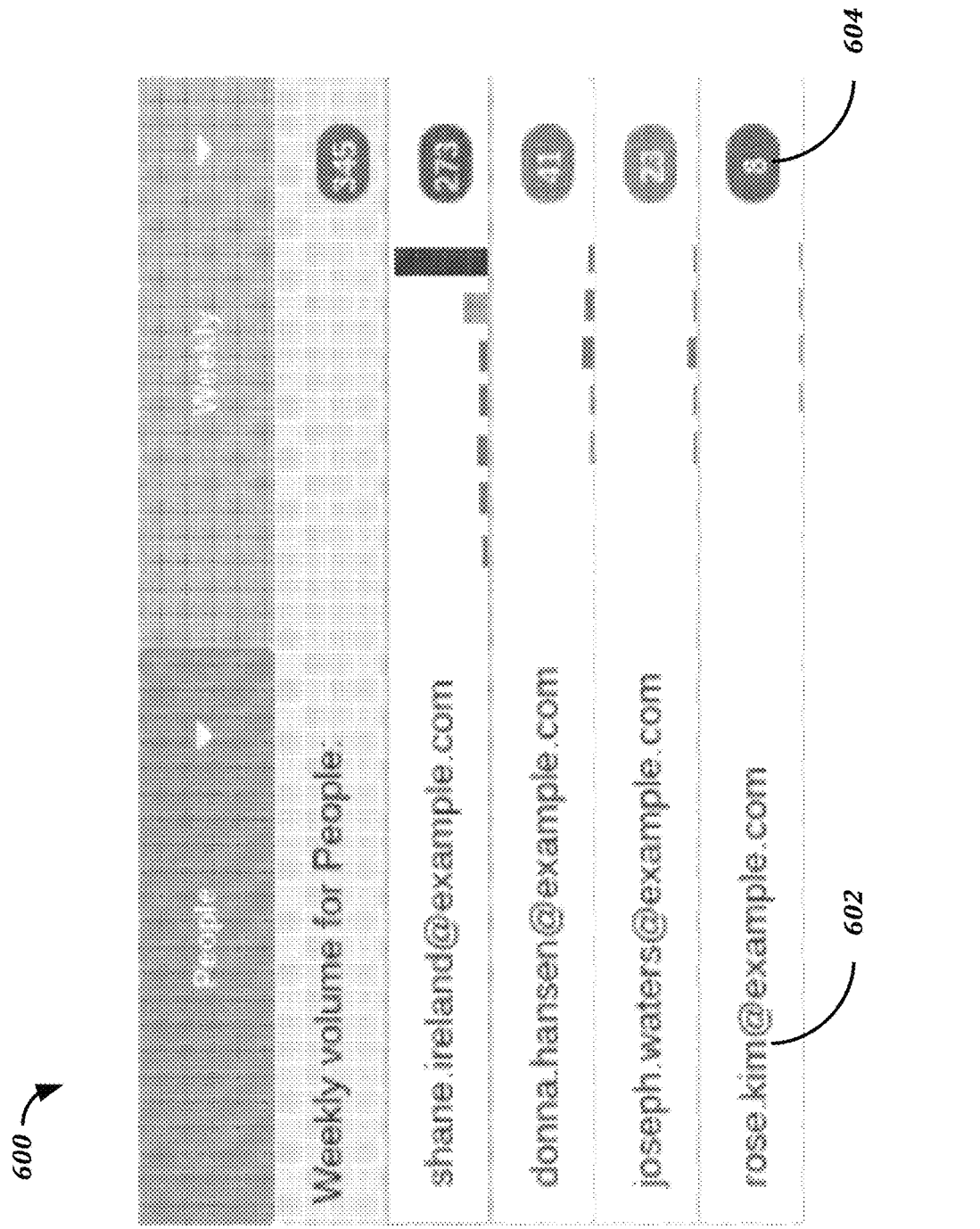
FIG. 6 illustrates another user interface.

FIG. 6 illustrates an example user interface 600 that includes a first column 602 that includes user names or account identifiers and a second column 604 that includes a number of messages sent over a period of time (e.g., weekly) by users. The user interfaces described herein may be implicated by, for example, software that is operative to retrieve data from the data store 204 (of FIG. 2) and present the data to a user on the user terminal 206. The software may, for example, verify and filter the data to provide the desired information to the user such as, for example, the email volume of an individual user or marketing accounts.

Figure 7:
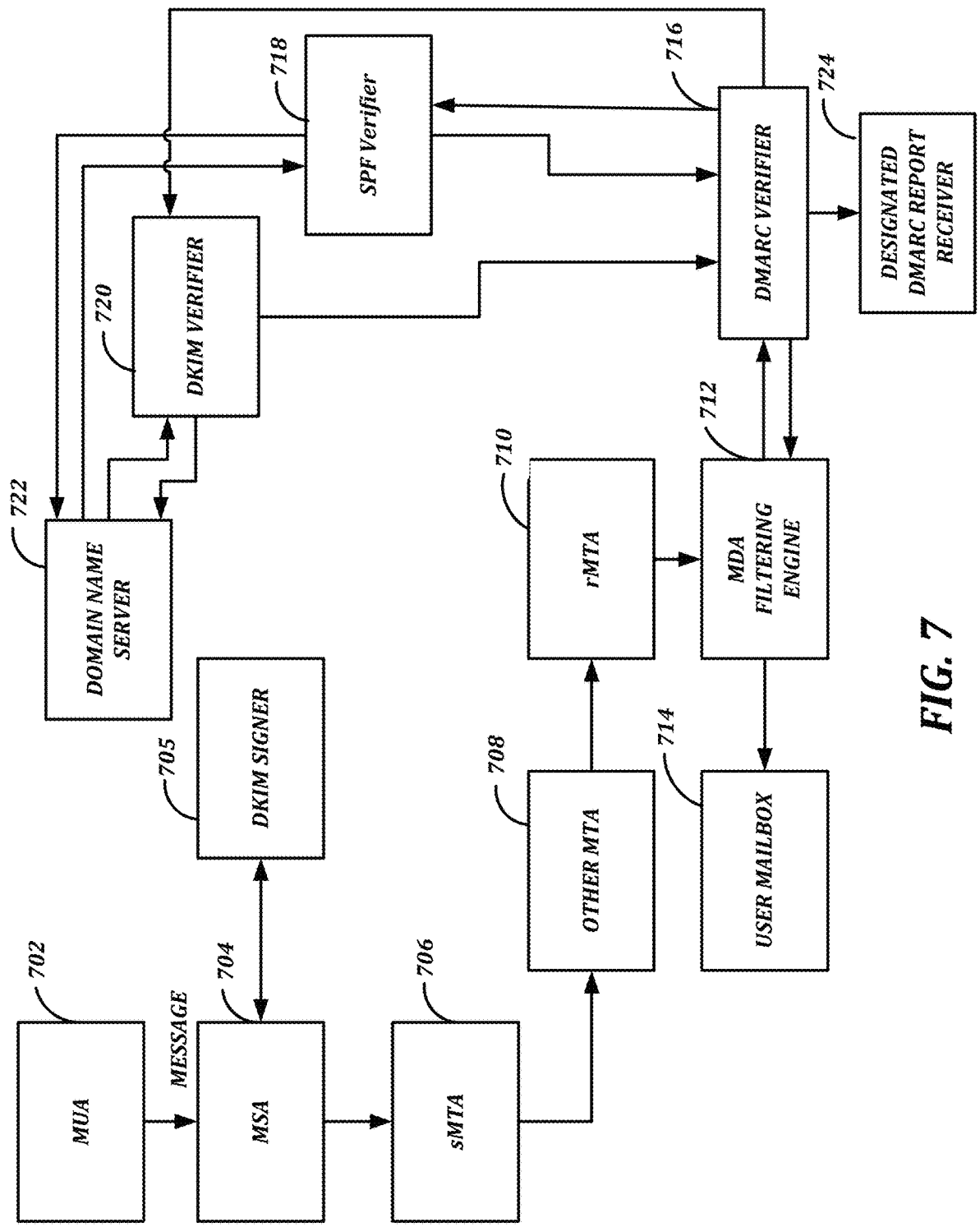
FIG. 7 illustrates a block diagram of an example method for performing authorization of email account holders to use external email service providers.

FIG. 7 illustrates an example of a block diagram of a message authentication data flow 700 in an SPF that includes DMARC. The message is generated by the mail user agent (MUA) 702 and sent to the mail submission agent (MSA) 704. The MSA 704 sends the message to a DKIM signer 705, which DKIM signs the message. The MSA 704 receives email messages from the MUA 702 and negotiates with message delivery with a sending mail transfer agent (sMTA) 706. The message may be forwarded by other MTAs 708 until the message is received by the receiving MTA (rMTA) 710. The message is transferred to the mail delivery agent (MDA) of the domain of the addressee in the MDA filtering engine in block 712.

The message is sent to the DMARC verifier portion 716. An SPF verifier portion 718 has inputs extracted from the message headers. The SPF verifier portion 718 attempts to validate messages against the SPF policy published at the alleged sender's domain until, for example, a match or error is found. The results of the SPF message validation could be a match, non-match, or an exception.

The DKIM verifier program may be called with needed inputs extracted from the message headers in block 720. In block 722, the DKIM verifier attempts to validate a message against sending the DNS-published public key per specification in the message headers. The results of the DKIM validation are returned to the DMARC verifier 716, and the results of the SPF verifier 718 and DKIM validation are returned to DMARC verifier 716.

The results of the DMARC verifier 716 are sent to the MDA 712 of the recipient. In block 714, the message is delivered to the User Mailbox of a receiver (a user) following authentication and assertion in the published policy. In block 716, a DMARC report is generated and sent to a designated DMARC report receiver in block 724.

Validation of the message is performed using the returned SPF policy and the message header data. The DNS query for the DMARC policy of the sending domain is performed in block 120.

Figure 8:
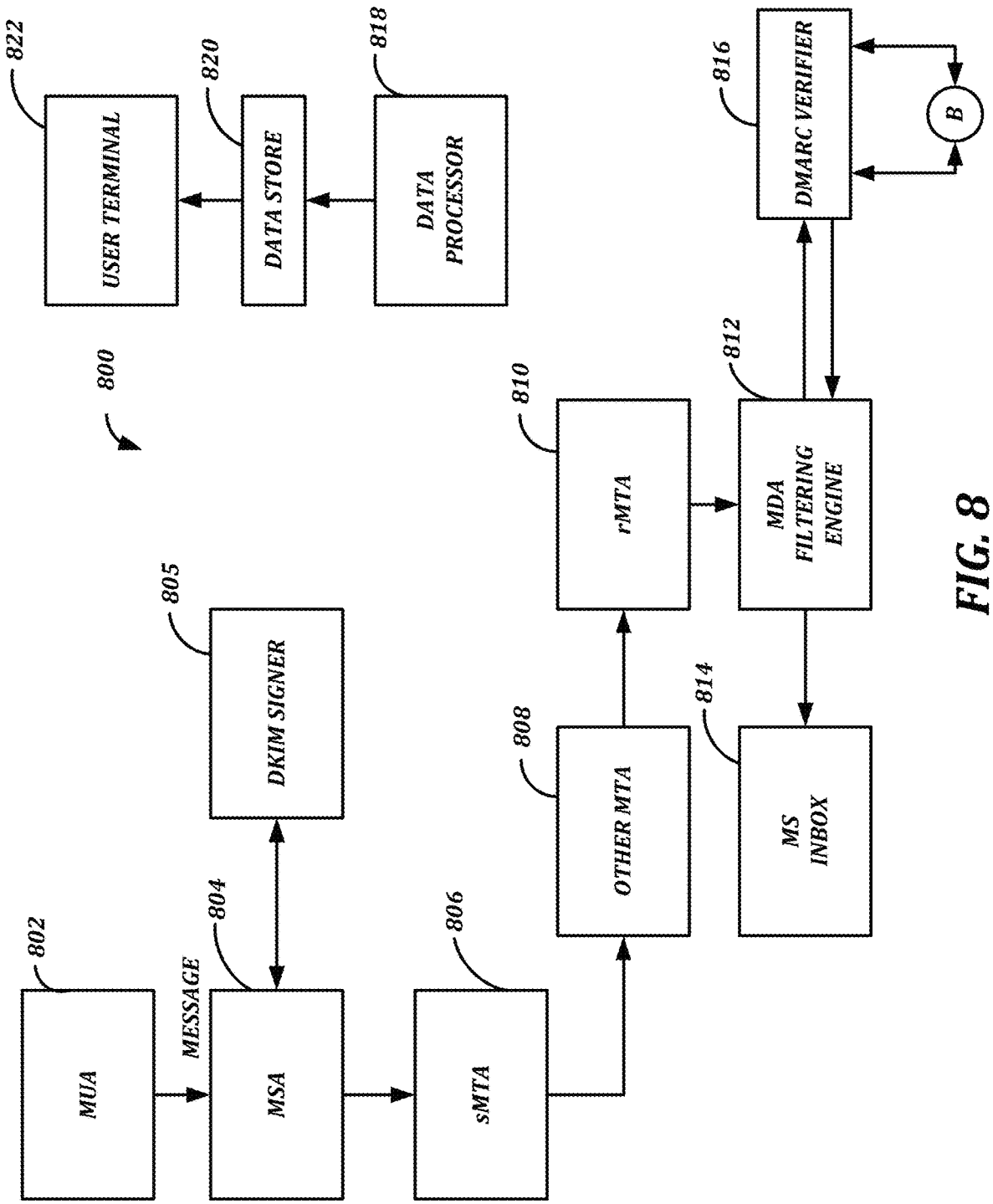
FIGS. 8 and 9 illustrate a block diagram of an example method for performing authorization of email account holders.
Figure 9:
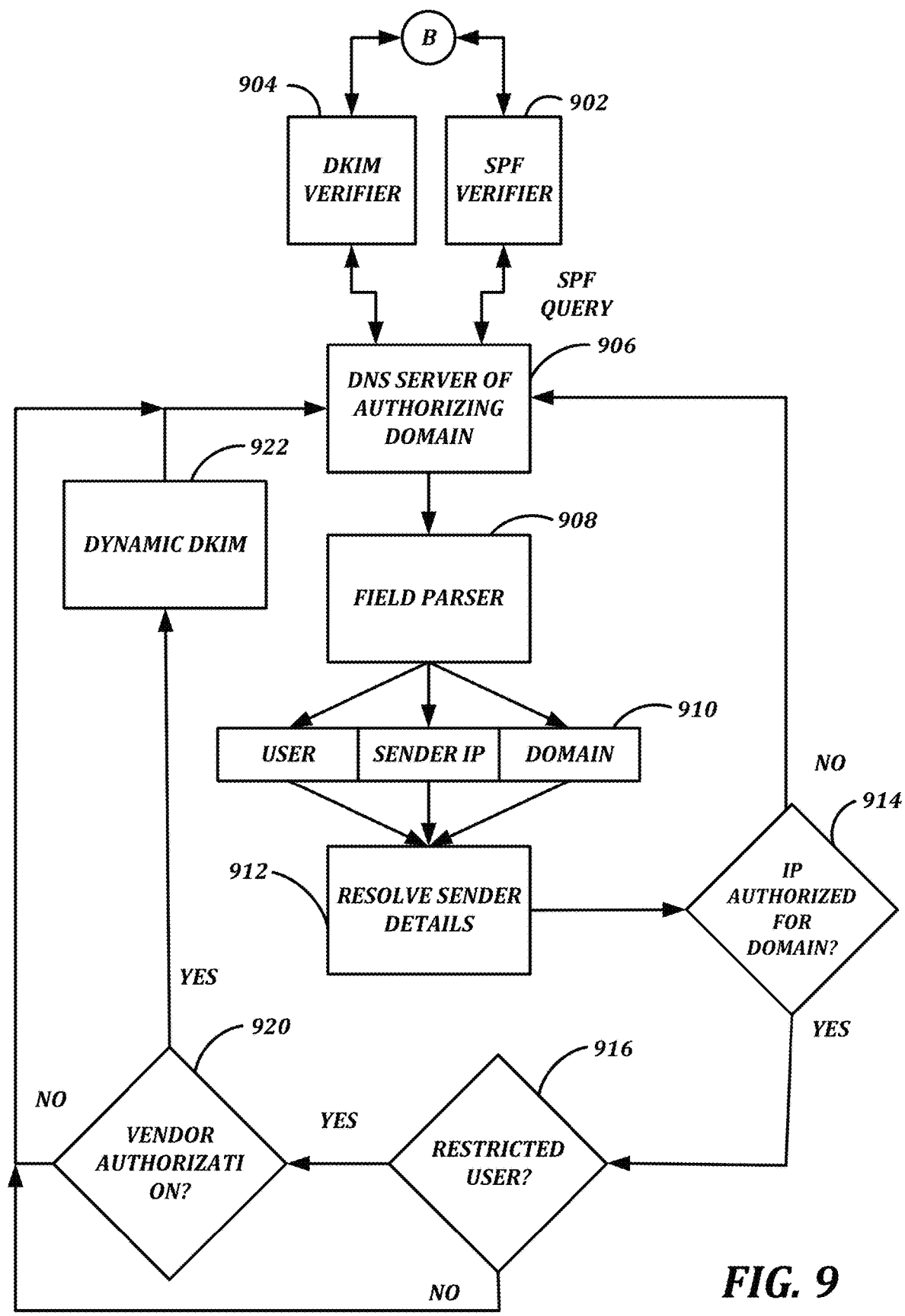

FIGS. 8 and 9 illustrate a block diagram 800 of an example method for performing authorization of email account holders to use external email service providers using message authentication domain name system queries.

The message is generated by the mail user agent (MUA) 802 and sent to the mail submission agent (MSA) 804. The MSA 804 sends the message to a DKIM signer 805, which DKIM signs the message. The MSA 804 receives email messages from the MUA 802 and negotiates with message delivery with a sending mail transfer agent (sMTA) 806. The message may be forwarded by other MTAs 808 until the message is received by the receiving MTA (rMTA) 810. The message is transferred to the mail delivery agent (MDA) of the domain of the addressee in the MDA filtering engine in block 812. The message is sent to the DMARC verifier portion 816.

During an SPF query, the macro endowed SPF term affects a DNS lookup of the domain in block 902. In block 904, the DKIM verifier program is called with needed inputs extracted from the message headers in block 904. In block 904, the DKIM verifier attempts to validate a message against sending the DNS-published public key per specification in the message headers.

In block 908, the SPF term macro is parsed into fields such as those disclosed for illustrative purposes in Table 1. In block 910, details about the sender are processed for authorization logic in the next step and for log storage in block 912. Heretofore, a plurality of checks may be performed. The checks may include, in no binding order, an IP authorization check, a user restriction check, and a vendor authorization check. Any one or more combinations of such checks may be performed.

In block 916, the system determines if there are sending restrictions associated or assigned to the user, and that the user is attempting to use a vendor that has user permissions. In some embodiments, a prior check for IP authorization at block 914 may be performed.

If the user is not restricted from using specific vendors in block 916, the system validates the sending IP against existing SPF policy in block 916. In some embodiments, an SPF evaluator function may return to the DNS server 906 a value corresponding to the results of vendor, IP, and user verification checks. The DNS server 906 may respond accordingly to the SPF verifier 902. If the user is not using a restricted vendor, the user would not be restricted from processing an outbound message through the vendor. The user authorization is checked to determine whether the user is authorized to use the vendor to send email.

In block 922, if the user is authorized to send a message using the vendor, then the DKIM public key specific to the vendor is published, and a 'pass' is returned to the SPF verifier. IF the user is not authorized, the DKIM public key remains unpublished and a 'fail' is returned to the SPF verifier 902.

The DKIM authentication subsequent to the dynamically published key will now pass DKIM verification in block 904. The DKIM verifier 904 and SPF verifier 902 return a result to the DMARC verifier 816. Data is saved in the data store 820 (of FIG. 8). The data is accessible to a user via an administrator application, which provides fast access to individual user sending statistics. The data may be presented to the user on a user terminal 822 that is operative to display the data to the user and provide a user interface for the user.

Consistent with embodiment of the present disclosure, data processor 818 may be employed to, for example, populate the data store. This may be performed by, for example, the data processor accessing the DNS query log and processing the queries contained therein. In some embodiments, for instance, the processing would be based on anchor characters used to, for instance, identify the locations associated with data captured from the macro sequences associated with the SPF policies corresponding to the queries. Such extracted data may then be provided to data store 820, which may then be employed for displaying data or enabling actions based upon the data.

Figure 10:
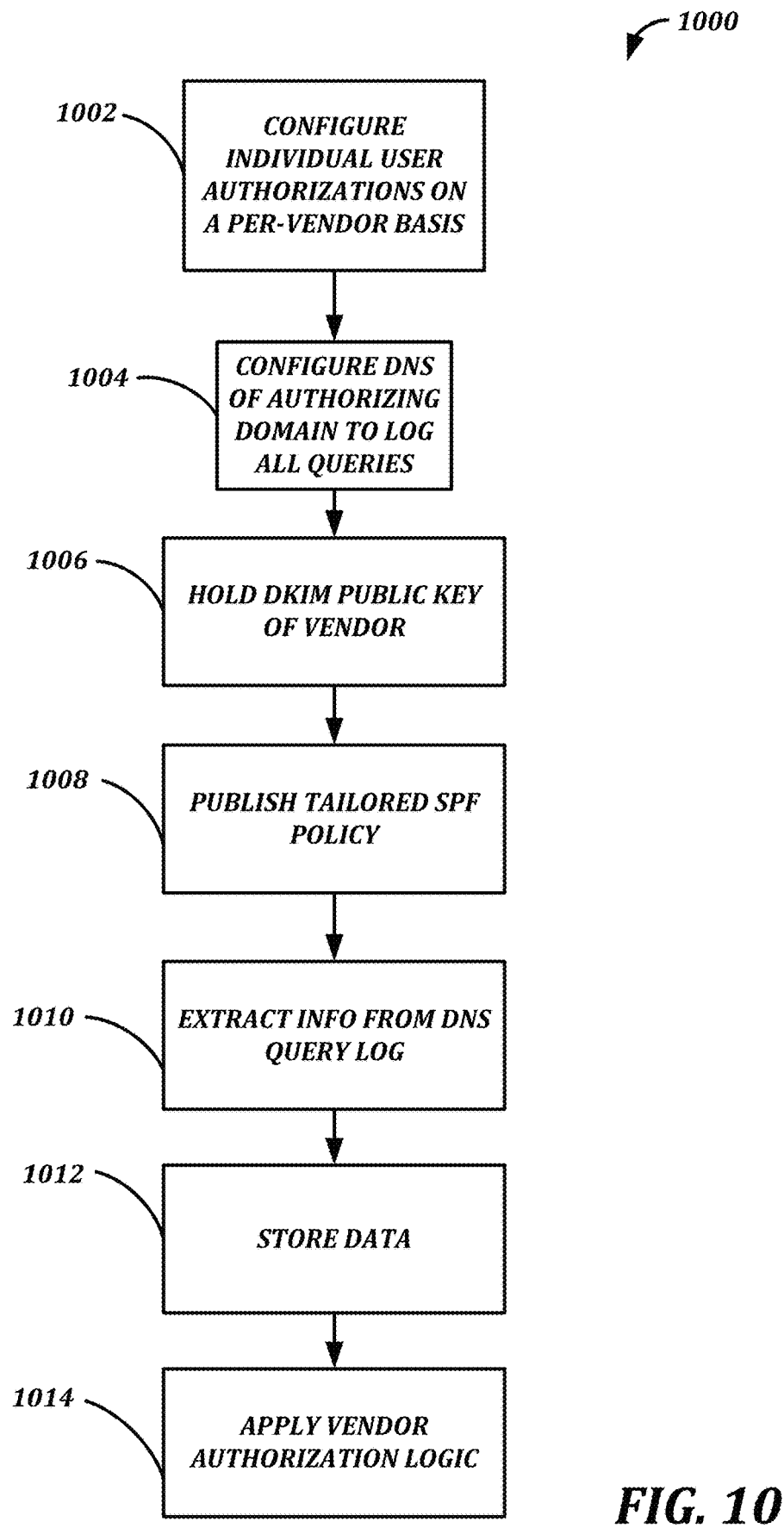
FIG. 10 illustrates a block diagram of a method for performing authorization of email account holders.

FIG. 10 illustrates a flow diagram of a method 1000 for performing authorization of email account holders. It should be noted that this is one example, of a plurality of examples, of how authorization may be performed. In block 1002, the system configures individual user authorizations on a per-vendor basis. A sample administrator user interface for managing individual vendor authorizations is described below and in FIG. 12. For example, the user is "shane.ireland@example.com" and the authorizations for each EXP in the list can be toggled between on and off. For example, the user is allowed to send messages on behalf of the organization using Sendgrid, but not using DocuSign, MailChimp, or Constant Contact. The individual user configurations are stored in a way that once a message authentication request is made, a reply can be served in accordance with the vendor authorized settings. An example of such a file 1100 is shown in FIG. 11.

Referring back to FIG. 10, in block 1004 the DNS of authorizing domain to log all queries includes access to the relevant DNS query logs. Data from the relevant DNS query logs will be used in the method to authenticate vendor-sent messages according to the authorizations of the user. In block 1006, the vendor DKIM public keys are managed by being retained without publishing.

In block 1008, the tailored SPF policy is published. The SPF policy should have as the first term an "exists" mechanism that specifies a domain name to use in a DNS A-record query during the SPF authentication process. When combined with a special SPF macro character sequences as described in RFC 7208, the name of the domain to be queried can be constructed from a variety of message properties including, for example, an email address of the sender, IP, and the HELO/EHLO domain of the outbound server.

As one non-limiting example, an example 'exists' term published as part of an SPF policy published in a domain DNS includes, for example:

exists:_i. %{i}._o. %{o}._d. %{d}._l. %{l}._h.%{h}.example.com

A summary of the terms regarding the macro fields used in this example is shown above in Table 1.

Information is extracted from the DNS query log in block 1010. The information about the sent email is contained in the query string. As indicative above, a DNS query has an example form of:

_i.209.XX.XXX.41._o.example.com_d.example.com._l. joe._h.google.com.exampl e.com When the DNS query is made the DNS logging system records the query into a log file. One may implement various strategies for demarcating and/or extracting each information field. Such a strategy is exemplified here using underscore-letter-dot tags, e.g., '_i.' that precede each respective macro field. Other techniques may be employed to accomplish the same task, and may be employed by data processor 818.

Since the results of a query may correspond to a non-existent domain, without an intervening process to negotiate the authentication, the result of this query could be 'NXDOMAIN'. In such a case, or a case where the DNS server becomes unresponsive to the authentication query, the proposed short-circuiting of the authentication simply fails into normal authentication channels.

The data is stored in block 1012 may be stored in a location that is separate from the DNS query logs. In some embodiments, the data may be stored in, for example, data store 820. Updates to the data are pulled from the DNS query logs in an automated way such as, for example, scripts or other routines. If the DNS server is properly configured, the data store may be updated upon each relevant entry into the DNS query logs. Alternatively timed scripts may be used to update the logs.

Vendor authorization logic to reply to the message authentication requests is applied in block 1014. Once a vendor is identified by the source IP, and the user account is extracted from the DNS query, the permission for that user to send messages via that vendor are determined from the configuration, e.g., by comparing entries in a configuration file such as 1100 (of FIG. 11).

If the user is allowed to send through the vendor account, then the corresponding DKIM public key of the vendor is published in the DNS of the domain with a short time to live (TTL) such as, for example, a TTL value of 120 corresponding to two minute catching. A passing SPF evaluation is returned to the SPF verifier 902 (of FIG. 9). The message will authenticate and be delivered to the MUA of the receiver when a passing SPF disposition and a successful DKIM signature check are returned.

FIG. 11 illustrates an example of a configuration file 1100 that has a user column 1102, a vendor column 1104, and a permission column 1106.

If the user is allowed to send through a vendor account, then the corresponding DKIM public key of the vendor is published in the DNS of the domain with a short time to live (TTL) catching and a passing SPF evaluation is returned to the SPF verifier. Upon returning a passing SPF disposition and a successful DKIM signature check, the message will authenticate and be delivered to the mail user agent of the receiver.

Figure 12:
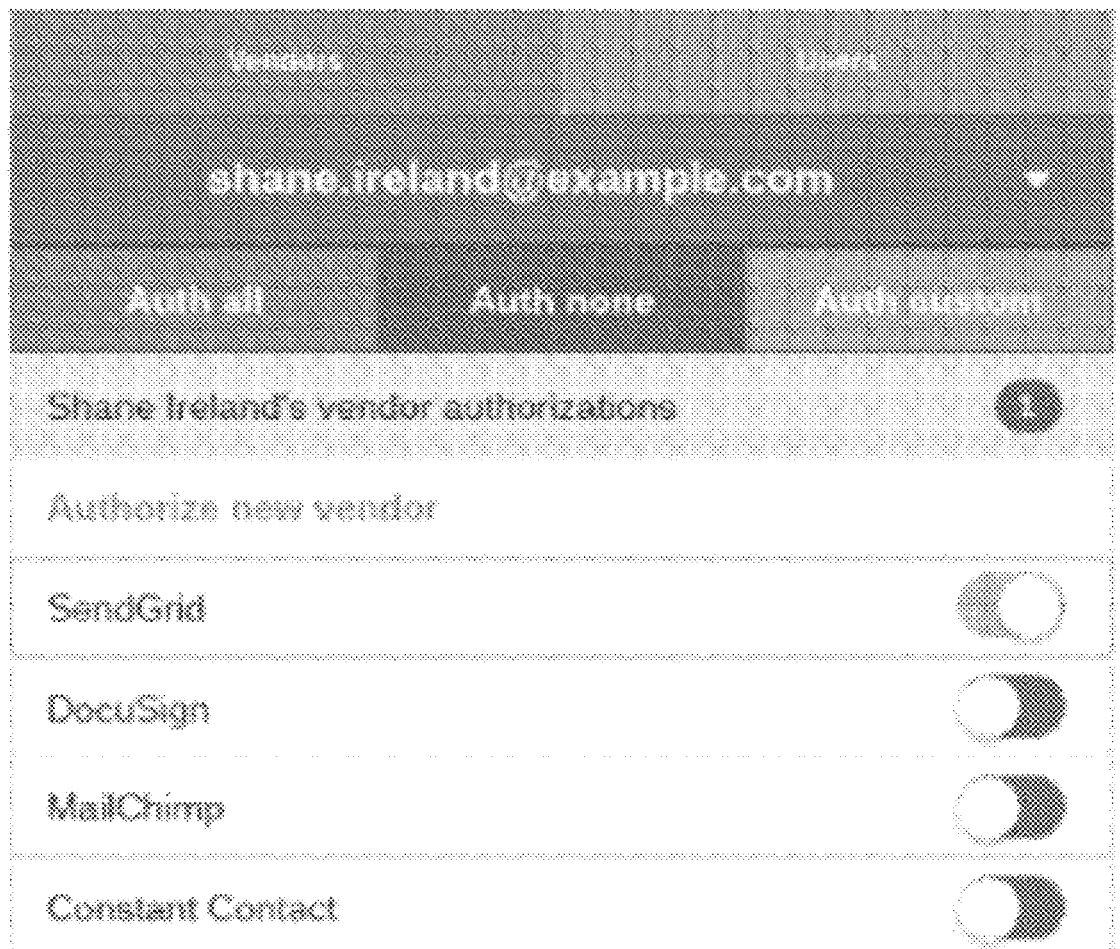
FIG. 12 illustrates an example user interface for managing vendor access.

FIG. 12 illustrates an example user interface 1200 for managing vendor access by individual email users. In this regard, the user shane.ireland@example.com is authorized to use one of the four email service providers for the organization.

The example methods and systems disclosed herein provide for collecting email sending volume for individual users using message authentication domain name system queries. Other examples provide for performing an in situ authorization of email account holders to use external email service providers using message authentication domain name system queries.

The various modules illustrated in the Figures, such as FIGS. 2-3 and 8-9 may be performed by one or more computing devices, individually or in combination. The one or more computing devices may be a local device and/or hosted on a centralized server, such as, for example, a cloud computing service. Although the methods has been described to be performed by various computing elements, it should be understood that, in some embodiments, different operations may be performed by different networked elements in operative communication with computing device 1300.

Embodiments of the present disclosure may comprise a system having a memory storage and a processing unit. The processing unit coupled to the memory storage, wherein the processing unit is configured to perform the stages of the various methods.

Figure 13:
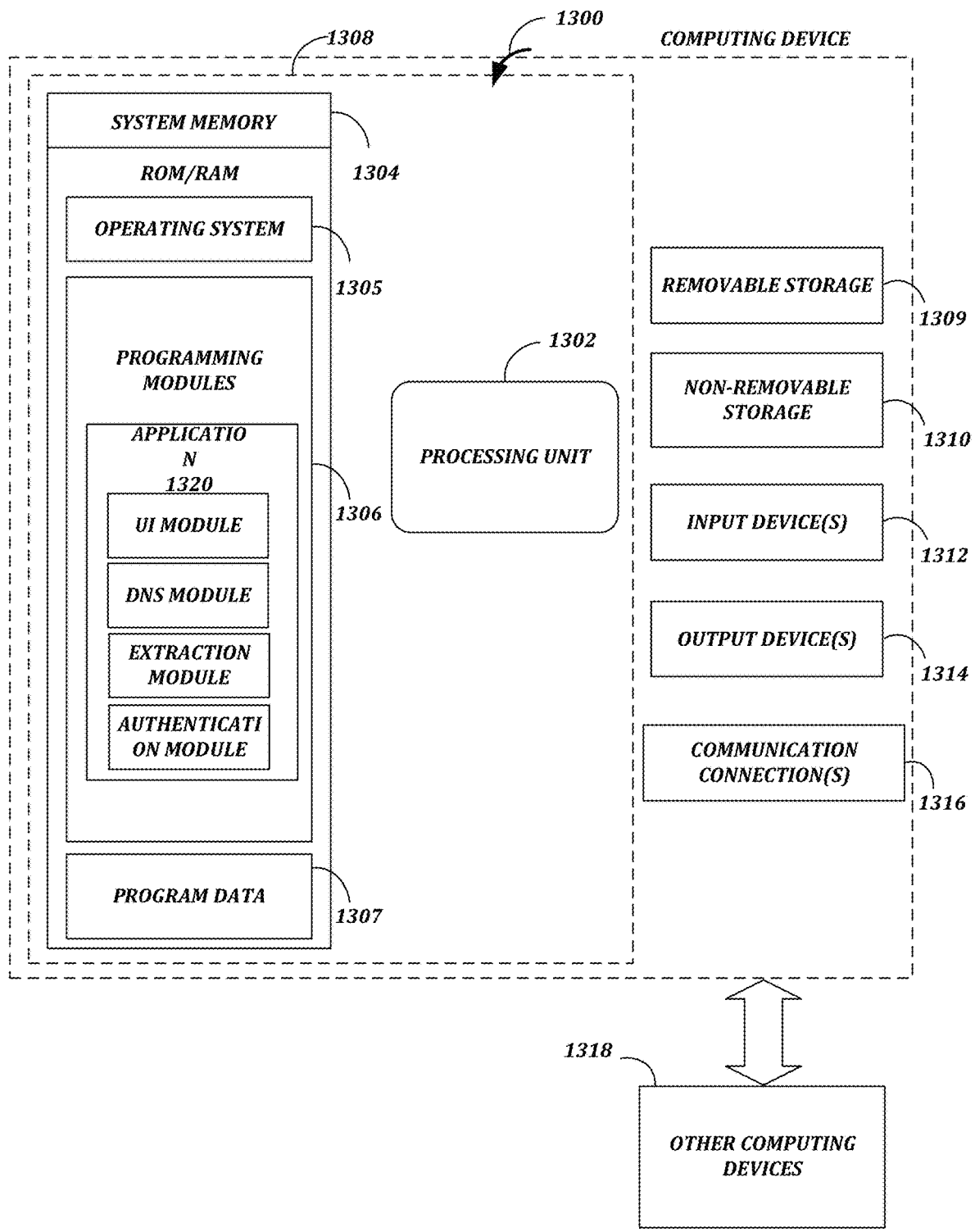
FIG. 13 illustrates a computing device compatible with the various embodiments of the present disclosure.

FIG. 13 is a block diagram of a system including computing device 1300. Consistent with an embodiment of the disclosure, the aforementioned memory storage and processing unit may be implemented in a computing device, such as computing device 1300 of FIG. 13. Any suitable combination of hardware, software, or firmware may be used to implement the memory storage and processing unit. For example, the memory storage and processing unit may be implemented with computing device 1300 or any of other computing devices 1318, in combination with computing device 1300. The aforementioned system, device, and processors are examples and other systems, devices, and processors may comprise the aforementioned memory storage and processing unit, consistent with embodiments of the disclosure.

With reference to FIG. 13, a system consistent with an embodiment of the disclosure may include a computing device, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random access memory (RAM)), non-volatile (e.g. read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include a UI module (e.g., terminal), a DNS module, an Extraction Module (e.g., Data Processor), and an authorization module. Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and nonvolatile, removable and non-removable media implemented in any method or technology for storage of information, such as computer readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., application 1320) may perform processes including, for example, one or more of method stages as described above. The aforementioned process is an example, and processing unit 1302 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

A variety of terms are used herein that should be known to one of ordinary skill in the art.

Internet Protocol (IP)—the IP specifies how the transmission of data from sources to destinations is performed. In particular, the implementation involves unique fixed-length addresses for the sending source and the receiving destination. The specifications about IP addressing is given in RFC 791.

Domain Name System (DNS)—The DNS is a hierarchical and decentralized naming system for computers, services, or other resources connected to the Internet or a private network. There are many RFCs that cover DNS standards, but RFC 1034 and RFC 1035 provide much information about concepts and implementation.

Internet Message Format—the vocabulary associated with email accounts is introduced for use in descriptions provided in subsequent sections. The specifications for these matters are covered in RFC 5322. The address specification for an email address is a string of characters constituted of a 'local-part' and the 'domain' separated by the at-sign character("@", ASCII value 64).

For example, in the address 'xyz@example.com', the local-part is 'xyz' and the domain is 'example.com'.

The 'from' address that occurs in a received message is sometimes referred to as the 5322. From address, as the specification is covered in RFC 5322. One of the reasons that email authentication protocols have been developed is the ease by which such information can be forged, e.g., with the proper tools, the 5322. From address in a sent message can be set to any address a dishonest sender may desire. Part of the DMARC validation process considers the legitimacy of this 5322. From address.

Simple Mail Transfer Protocol (SMTP)—the schemes by which email messages are transported from the sender to a receiver have many technical details that are not relevant to the embodiments described here. The current specification for how electronic mail is transferred is provided in RFC 5321.While SMTP uses only a reliable ordered data stream channel and is independent of the particular transmission subsystem, messages are typically transmitted using TCP connection which guarantees IP resolution of the source. Other transport methods are described in the Appendices of RFC 821.

Sender Policy Framework (SPF)—before an email is delivered to an email inbox of an addressee, the corresponding Mail Delivery Agent (MDA) should take steps to authenticate the sender of the email. One of the most utilized authentication protocols is the Sender Policy Framework (SPF). A domain owner asserts a list of IP addresses authorized to send email on behalf of the domain by specifying them in an SPF policy published as a TXT resource record in the DNS of the domain. The rules and syntax for the SPF protocol are specified in RFC 7208.

The SPF authentication process systematically compares the IP of the sender with those published in the SPF policy of the domain. If a match is found, the message passes this authentication check; otherwise, authentication fails. For the purposes of accounting for the amount of email being sent by individual users, the actual SPF pass- or fail-disposition of the message is not relevant. Instead, an SPF term in the policy is specially-crafted with a substitutable macro character sequence to affect a DNS query; this will, in turn, generate an immediately accessible DNS log entry containing the information needed to resolve information about the sending source.

DMARC is a protocol for asserting an organization's preferences regarding delivery of messages that do not pass validation checks. DMARC further provides a framework for generating reports of the authenticating disposition of messages that use the 5322. Fromaddress of the organization's domain. It is designed to give email domain owners the ability to protect their domain against email identity impersonation, commonly known as email spoofing. The primary outcome of implementing strict DMARC enforcement is to protect a domain from being used in business email compromise attacks, phishing emails, email scams and other cyber threat activities.

There are two from addresses associated with a message: the RFC 5321.MailFrom address and the RFC 5322. From address. SPF authentication alone: validates a sender against the nominal 5321.MailFrom address, falls back to RFC 5321.HELO address when the 5321.MailFrom is missing, and provides no consistency check between 5321.MailFrom and 5322.From from addresses.

The following conditions constitute DMARC identifier alignment for the respective authentication methods: DKIM: domain specified with 'd=' tag must match 5322.From address and SPF: the SPF-authenticated domain (5321.MailFrom or 5321.HELO) and the 5322.From domain must be in alignment, as defined in RFC 7489, e.g., the organizational domains must be identical.

There are many more nuances to the authentication process. The main point here is that there is a difference between authentication solely based on SPF alone and that based on DMARC verification via SPF. The authentication flow for DMARC with SPF is diagrammed in FIG. 1.

A typical DMARC report generated by a sending MDA includes aggregated information about sender IP addresses, 5321.MailFrom domain, 5322.From domain, and the results of individual policy-based message authentications, e.g., a SPF pass or fail, and the DMARC disposition of each message. Conventionally, DMARC reports are sent to the authorized receivers of the domain once in a fixed 24 hour time interval. Importantly, individual messages are not time-stamped; only a single timestamp for the report itself is present. In simple terms, with DMARC alone administrators will wait an entire day or more to get sending information that does not include message timestamps or sender addresses.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following disclose a first set of aspects of the present disclosure. The various first set of aspects are not to be construed as patent claims unless the language of the aspect appears as a patent claim. The first set of aspects describe various non-limiting embodiments of the present disclosure.

Aspect 1 A system comprising:
a. a memory storage; and
b. a processor in operative communication with the memory storage, the processing being configured to:
c. enable a configuration of individual user authorizations to allow outbound messaging through a specification of one or more authorized vendors;
d. from publication to the DNS at least one DKIM public key associated with the one or more authorized vendors;

e. a customized sender policy framework (SPF) policy to the DNS, the customized SPF policy comprising a macro-endowed mechanism for obtaining at least one of the following:
  i. username,
  ii. IP address, and
  iii. domain;
f. a received SPF customized queries;
g. a log comprising the received SPF customized queries;
h. data from the received SPF customized queries, the extracted data having been populated by the macro mechanism associated with the SPF customized query;
i. the extracted data comprising at least one of the following: the username, the IP address, and the domain, as extracted from each received SPF customized query; and
j. whether an individual associated with the username is authorized to utilize a vendor associated with the domain;
k. upon a determination that the individual is authorized to utilize the vendor, a DKIM public associated with the vendor.

Aspect 2. A method comprising:
a. a configuration individual user authorizations for allowing outbound messaging through a specification of one or more authorized vendors;
b. a customized sender policy framework (SPF) policy to the DNS, the customized SPF policy comprising a macro-endowed mechanism for obtaining at least one of the following:
  i. username,
  ii. IP address, and
  iii. domain;
c. a received SPF customized queries;
d. a log comprising the received SPF customized queries;
e. data from the received SPF customized queries, the extracted data having been populated by the macro mechanism associated with the SPF customized query;
f. the extracted data comprising at least one of the following: the username, the IP address, and the domain, as extracted from each received SPF customized query; and
g. whether an individual associated with the username is authorized to utilize a vendor associated with the domain;
h. upon a determination that the individual is authorized to utilize the vendor, a function to authorize the outbound messaging, wherein performing the function to authorize the outbound messaging comprises informing at least one function running a domain name system (DNS) so that an appropriate qualifier can be returned to for SPF verification.

Aspect 3. A computer-readable medium comprising a set of instructions which when executed by a computer perform a method, the method comprising:
a. a configuration of individual user authorizations for allowing outbound messaging through a specification of one or more authorized vendors;
b. a customized sender policy framework (SPF) policy to the DNS, the customized SPF policy comprising a macro-endowed mechanism for obtaining at least one of the following:
  i. username,
  ii. IP address, and
  iii. domain;
c. a received SPF customized queries;
d. a log comprising the received SPF customized queries;
e. data from the received SPF customized queries, the extracted data having been populated by the macro mechanism associated with the SPF customized query;
f. the extracted data comprising at least one of the following: the username, the IP address, and the domain, as extracted from each received SPF customized query; and
g. whether an individual associated with the username is authorized to utilize a vendor associated with the domain;
h. upon a determination that the individual is authorized to utilize the vendor, a function to authorize the outbound messaging. wherein performing the function to authorize the outbound messaging comprises providing an affirmative response to an authentication request in accordance with a corresponding messaging protocol utilized, at least in part, to perform a message request.

Aspect 4. The method of Aspect 2, wherein the customized SPF policy comprises at least one of the following:
  i. macro character sequences, and
  ii. term is either a mechanism or a modifier, such as, but not limited to, an 'exists' term, an 'a' term, an 'mx' term, an 'include term, a 'redirect' modifier that accepts macros, and any other mechanism that is macro compatible.

Aspect 5. The method of Aspect 2, wherein the macro-endowed mechanism comprises at least one macro term used as a sender mechanism for identifying at least one of the following: a username, an IP addresses, and a domain.

Aspect 6. The method of Aspect 5, wherein particular macro sequences of the macro-endowed mechanism facilitate a capture of data from an email being sent by a specific user.

Aspect 7. The method of Aspect 6, wherein saving the string comprises processing the query log for the data captured by the macro-endowed mechanism.

Aspect 8. The method of Aspect 7, further comprising at least one of the following:
a. extracting the captured data, and
b. the extracted data as a string.

Aspect 9. The method of Aspect 8, wherein extracting comprises identifying a demarcation within the query to determine a location of the data captured by the macro-endowed mechanism.

Aspect 10. The method of Aspect 8, wherein storing comprises providing auxiliary data associated with logged SPF queries, the auxiliary data comprising a timestamp.

Aspect 11. The method of Aspect 2, further comprising displaying, via a user interface, an identifier associated with system user and a number of emails sent by the user over a time period.

Aspect 12. The method of Aspect 2, wherein the displaying is based on a retrieval of data extracted from a DNS query log comprising aspects captured from the macro-endowed mechanism.

Aspect 13. The computer-readable medium of Aspect 3, wherein the customized SPF policy comprises at least one of the following:
  i. a macro character sequences, and
  ii. term is either a mechanism or a modifier, such as, but not limited to, an 'exists' term, an 'a' term, an 'mx' term, an 'include term, a 'redirect' modifier that accepts macros, and any other mechanism that is macro compatible.

Aspect 14. The computer-readable medium of Aspect 13, wherein the macro-endowed mechanism comprises at least one macro term used as a sender mechanism for identifying at least one of the following: a username, an IP addresses, and a domain.

Aspect 15. The computer-readable medium of Aspect 14, wherein particular macro sequences of the macro-endowed mechanism facilitate a capture of data from an email being sent by a specific user.

Aspect 16. The computer-readable medium of Aspect 15, wherein saving the string comprises processing the query log for the data captured by the macro-endowed mechanism.

Aspect 17. The computer-readable medium of Aspect 16, further comprising at least one of the following:
  a. the captured data, and
  b. storing the extracted data as a string.

Aspect 18. The computer-readable medium of Aspect 17, wherein extracting comprises identifying a demarcation within the query to determine a location of the data captured by the macro-endowed mechanism.

Aspect 19. The computer-readable medium of Aspect 17, wherein storing comprises providing auxiliary data associated with logged SPF queries, the auxiliary data comprising a timestamp.

Aspect 20. The computer-readable medium of Aspect 3, further comprising displaying, via a user interface, an identifier associated with system user and a number of emails sent by the user over a time period.

The following disclose a second set of aspects of the present disclosure. The various second set of aspects are not to be construed as patent claims unless the language of the aspect appears as a patent claim. The second set of aspects describe various non-limiting embodiments of the present disclosure.

Aspect 1. A method comprising:
  a. receiving a configuration for a domain name system (DNS) to log all queries;
  b. publishing a customized sender policy framework (SPF) policy to the DNS, the customized SPF policy comprising a macro-endowed mechanism for obtaining at least one of the following:
    i. a username,
    ii. an IP address, and
    iii. a domain;
  c. logging a plurality of received SPF customized queries;
  d. accessing a log comprising the plurality of received SPF customized queries;
  e. extracting data from each of the received SPF customized queries, the data being populated by the macro mechanism associated with the SPF customized query;
  f. populating a datastore with extracted data comprising at least one of the following: the username, the IP address, and the domain, as extracted from each received SPF customized query; and
  g. providing, based on the extracted data, an indication of outbound emails sent from the domain.

Aspect 2. The method of claim 1, wherein the customized SPF policy comprises at least one of the following:
  i. a macro character sequences, and
  ii. a term is either a mechanism or a modifier, such as, but not limited to, an 'exists' term, an 'a' term, an 'mx' term, an 'include term, a 'redirect' modifier that accepts macros, and any other mechanism that is macro compatible.

Aspect 3. The method of claim 1, wherein the macro-endowed mechanism comprises at least one macro term used as a sender mechanism for identifying at least one of the following: a username, an IP addresses, and a domain.

Aspect 4. The method of claim 1, wherein particular macro sequences of the macro-endowed mechanism facilitate a capture of data from an email being sent by a specific user.

Aspect 5. The method of claim 4, wherein saving the string comprises processing the query log for the data captured by the macro-endowed mechanism.

Aspect 6. The method of claim 5, further comprising at least one of the following:
  a. extracting the captured data, and
  b. storing the extracted data as a string.

Aspect 7. The method of claim 7, wherein extracting comprises identifying a demarcation within the query to determine a location of the data captured by the macro-endowed mechanism.

Aspect 8. The method of claim 6, wherein storing comprises providing auxiliary data associated with logged SPF queries, the auxiliary data comprising a timestamp.

Aspect 9. The method of claim 1, further comprising displaying, via a user interface, an identifier associated with system user and a number of emails sent by the user over a time period.

Aspect 10. The method of claim 9, wherein the displaying is based on a retrieval of data extracted from a DNS query log comprising aspects captured from the macro-endowed mechanism.

Aspect 11. A system for tracking messages, the system comprising:
  i. a memory storage; and
  ii. a processor in operative communication with the memory storage, the processing being operative to:
    publish a customized sender policy framework (SPF) policy to the DNS, the customized SPF policy comprising a macro-endowed mechanism for obtaining at least one of the following:
      a username,
      an IP address, and
      a domain;
    a. log a plurality of received SPF customized queries;
    b. access a log comprising the plurality of received SPF customized queries;
    c. extract data from each of the received SPF customized queries, the data being populated by the macro mechanism associated with the SPF customized query;
    d. populate the memory with extracted data comprising at least one of the following: the username, the IP address, and the domain, as extracted from each received SPF customized query; and
    e. organize a display of the extracted data, the display being configured to provide an indication of outbound emails sent from the domain.

Aspect 12. The system of claim 10, wherein macro-endowed mechanism includes a term, an "exists" mechanism specifies a domain name to use in a DNS A-record query during the SPF authentication process.

Aspect 13. The system of claim 11, wherein the 'exists' term is a sender mechanism for identifying IP addresses that either are permitted or are not permitted to use an email of a domain identity.

Aspect 14. The system of claim 11, wherein combining the 'exists' mechanism with particular macro sequences facilitates accounting an email being sent by a specific user.

Aspect 15. The system of claim 10, wherein the processor is further operative to save a string corresponding to a DNS query log, Aspect 16. The system of claim 15, wherein the processor is further configured to process the query log for the data captured by the macro-endowed mechanism.

Aspect 17. The system of claim 16, wherein the processor is further configured to:
  i. extract the captured data.

Aspect 18. The system of claim 16, wherein the processor is further configured to:
  i. extract the captured data, and
  ii. store the extracted data as a string.

Aspect 19. The system of claim 18, wherein the processor is further configured to identify a demarcation within the query to determine a location of the data captured by the macro-endowed mechanism.

Aspect 20. The system of claim 18, wherein the processor is further configured to append auxiliary data associated with logged SPF queries, the auxiliary data comprising a timestamp.

Aspect 21. The system of claim 10, wherein the processor is further provided, via a user interface, an identifier associated with system user and a number of emails sent by the user over a time period.

Aspect 22. The method of claim 9, wherein the displaying is based on a retrieval of data extracted from a DNS query log comprising aspects captured from the macro-endowed mechanism.

Aspect 23. A computer-readable medium including instructions for performing a method, the method executed by the instructions comprising:
 a. publishing a customized sender policy framework (SPF) policy to the DNS, the customized SPF policy comprising a macro-endowed mechanism for obtaining at least one of the following:
  i. a username,
  ii. an IP address, and
  iii. a domain;
 b. logging a plurality of received SPF customized queries;
 c. accessing a log comprising the plurality of received SPF customized queries;
 d. extracting data from each of the received SPF customized queries, the data being populated by the macro mechanism associated with the SPF customized query;
 e. populating a datastore with extracted data comprising at least one of the following: the username, the IP address, and the domain, as extracted from each received SPF customized query; and
 f. organizing a display of the extracted data, wherein organizing a display of the extracted data comprises providing an indication of outbound emails sent from the domain.

Aspect 24. The computer-readable medium of claim 23, wherein the customized SPF policy comprises at least one of the following:
 i. a macro character sequences, and
 ii. a term is either a mechanism or a modifier, such as, but not limited to, an 'exists' term, an 'a' term, an 'mx' term, an 'include term, a 'redirect' modifier that accepts macros, and any other mechanism that is macro compatible.

Aspect 25. The computer-readable medium of claim 23, wherein the macro-endowed mechanism comprises at least one macro term used as a sender mechanism for identifying at least one of the following: a username, an IP addresses, and a domain. Aspect 26. The computer-readable medium of claim 23, wherein particular macro sequences of the macro-endowed mechanism facilitate a capture of data from an email being sent by a specific user.

Aspect 27. The computer-readable medium of claim 26, wherein saving the string comprises processing the query log for the data captured by the macro-endowed mechanism.

Aspect 28. The computer-readable medium of claim 26, further comprising at least one of the following:
 a. extracting the captured data, and
 b. storing the extracted data as a string.

Aspect 29. The computer-readable medium of claim 28, wherein extracting comprises identifying a demarcation within the query to determine a location of the data captured by the macro-endowed mechanism.

Aspect 30. The computer-readable medium of claim 28, wherein storing comprises providing auxiliary data associated with logged SPF queries, the auxiliary data comprising a timestamp.

The following is claimed:

1. A method comprising:
 receiving a configuration for a domain name system (DNS) to log all queries;
 publishing a customized sender policy framework (SPF) policy to the DNS, the customized SPF policy comprising a macro-endowed mechanism for obtaining a username and an Internet Protocol (IP) address;
 logging a plurality of received SPF customized queries;
 accessing a log comprising the plurality of received SPF customized queries;
 extracting data from each of the received SPF customized queries, the data being populated by the macro-endowed mechanism associated with at least one of the plurality of SPF customized queries;
 populating a datastore with extracted data comprising the username and the IP address, as extracted from each received SPF customized query;
 providing, based on the extracted data, an indication of outbound emails sent from a particular user of the domain; and
 publishing a DomainKeys Identified Mail (DKIM) public key upon a determination that the username and the IP address, from the extracted data, are approved for email communication.

2. The method of claim 1, wherein the customized SPF policy comprises at least one of the following:
 a macro character sequence, and
 a term that is either a mechanism or a modifier, selected from the group consisting of: an 'exists' term, an 'a' term, an 'mx' term, an 'include' term, or a 'redirect' modifier, that accepts macros.

3. The method of claim 1, wherein the macro-endowed mechanism comprises at least one macro term used as a sender mechanism for identifying the username and the IP address.

4. The method of claim 1, wherein particular macro sequences of the macro-endowed mechanism facilitate a capture of data from an email being sent by a specific user.

5. The method of claim 4, further comprising at least one of the following:
 extracting the captured data, and
 storing the extracted data as a string.

6. The method of claim 5, wherein storing the string comprises processing a DNS query log for the data captured by the macro-endowed mechanism.

7. The method of claim 6, wherein extracting comprises identifying a demarcation within the extracted data to determine a location of the data captured by the macro-endowed mechanism.

8. The method of claim 6, wherein storing comprises providing auxiliary data associated with logged SPF queries, the auxiliary data comprising a timestamp.

9. The method of claim 1, further comprising displaying, via a user interface, an identifier associated with system user and a number of emails sent by the user over a time period.

10. The method of claim 9, wherein the displaying is based on a retrieval of data extracted from a DNS query log comprising aspects captured from the macro-endowed mechanism.

11. A system for tracking messages, the system comprising:
- a memory storage; and
- a processor in operative communication with the memory storage, such that the processor, when executing instructions stored in the memory storage, causes performance of operations comprising:
  - publish a customized sender policy framework (SPF) policy to a domain name system (DNS), the customized SPF policy comprising a macro-endowed mechanism for obtaining a username and an Internet Protocol (IP) address;
  - log a plurality of received SPF customized queries,
  - access a log comprising the plurality of received SPF customized queries,
  - extract data from each of the received SPF customized queries, the data being populated by the macro-endowed mechanism associated with at least one of the plurality of SPF customized queries,
  - populate the memory with extracted data comprising the username and the IP address, as extracted from each received SPF customized query,
  - publish a DomainKeys Identified Mail (DKIM) public key upon a determination the username and the IP address, from the extracted data, are approved for email communication; and
  - organize a display of the extracted data, the display being configured to provide an indication of outbound emails sent from a particular user of the domain.

12. The system of claim 11, wherein the macro-endowed mechanism includes a term, and an "exists" mechanism specifying a domain name to use in a DNS A-record query during an SPF authentication process.

13. The system of claim 12, wherein the "exists" mechanism is a sender mechanism for identifying IP addresses that either are permitted or are not permitted to use an email of a domain identity.

14. The system of claim 12, wherein combining the "exists" mechanism with particular macro sequences facilitates accounting an email being sent by a specific user.

15. The system of claim 11, wherein the processor is further operative to save a string corresponding to a DNS query log.

16. The system of claim 15, wherein the processor is further configured to process the DNS query log for the data captured by the macro-endowed mechanism.

17. The system of claim 16, wherein the processor is further configured to:
- extract the captured data.

18. The system of claim 16, wherein the processor is further configured to:
- store the extracted data as a string.

19. The system of claim 17, wherein the processor is further configured to identify a demarcation within the extracted data to determine a location of the data captured by the macro-endowed mechanism.

20. The system of claim 18, wherein the processor is further configured to append auxiliary data associated with logged SPF queries, the auxiliary data comprising a timestamp.

\* \* \* \* \*